United States Patent
Hosoki et al.

(10) Patent No.: US 7,614,010 B2
(45) Date of Patent: Nov. 3, 2009

(54) INTERFACE APPARATUS, INTERFACE METHOD IN INFORMATION PROCESSING APPARATUS, AND INTERFACE PROGRAM

(75) Inventors: Mitsuhiro Hosoki, Tokyo (JP); Hiroshi Yamaguchi, Tokyo (JP)

(73) Assignee: Sony Corporation (JP)

( * ) Notice: Subject to any disclaimer, the term of this patent is extended or adjusted under 35 U.S.C. 154(b) by 259 days.

(21) Appl. No.: 11/542,805

(22) Filed: Oct. 3, 2006

(65) Prior Publication Data

US 2007/0143713 A1  Jun. 21, 2007

(30) Foreign Application Priority Data

Oct. 3, 2005  (JP) ............................ P2005-289506

(51) Int. Cl.
*G06F 3/048* (2006.01)
(52) U.S. Cl. ...................... 715/783; 715/802; 715/767; 715/779
(58) Field of Classification Search ................. 715/783, 715/802, 767, 779
See application file for complete search history.

(56) References Cited

U.S. PATENT DOCUMENTS

| | | | | |
|---|---|---|---|---|
| 6,831,666 B1 * | 12/2004 | Kreis | .......................... | 715/781 |
| 7,107,532 B1 * | 9/2006 | Billmaier et al. | ............ | 715/720 |
| 7,146,573 B2 * | 12/2006 | Brown et al. | ................. | 715/802 |
| 7,320,112 B2 * | 1/2008 | Yamaguchi et al. | ......... | 715/831 |

FOREIGN PATENT DOCUMENTS

| | | | |
|---|---|---|---|
| JP | 2000-322185 A | | 11/2000 |
| JP | 2003-157140 A | | 5/2003 |

* cited by examiner

*Primary Examiner*—Tadesse Hailu
*Assistant Examiner*—Nicholas S Ulrich
(74) *Attorney, Agent, or Firm*—Lerner, David, Littenberg, Krumholz & Mentlik, LLP

(57) ABSTRACT

An interface apparatus controls at least activation and termination of one or more registered application programs in accordance with user operations. The apparatus includes a first holding section configured to hold information of the application programs; a user operation acceptance section; a second holding section configured to receive and hold status information of each application program; a list presentation section configured to present an application program list window and to indicate at least whether a status of each application program is a running status or a terminated status based on the status information; a selection section configured to select an application program to be controlled from among the application programs in accordance with a predetermined first user operation; and a control section configured to control the status of the selected application program based on the status information when the user operation acceptance section has accepted a predetermined second user operation.

9 Claims, 17 Drawing Sheets

FIG. 5

| CURRENT STATUS | COLOR OF STATUS INDICATOR BAR | WORDS IN NEXT STATUS MESSAGE DISPLAY FIELD |
|---|---|---|
| RUNNING (FOREMOST) | ORANGE | PRESS ENTER TO TERMINATE |
| RUNNING (REARWARD) | BLUE | PRESS ENTER TO DISPLAY ON THE FOREGROUND |
| TERMINATED | GRAY | PRESS ENTER TO ACTIVATE |

| CURRENT STATUS | COLOR OF STATUS INDICATOR BAR | WHAT OCCURS WHEN ENTER IS PRESSED |
|---|---|---|
| RUNNING (FOREMOST) | ORANGE | TERMINATE |
| RUNNING (REARWARD) | BLUE | BECOME CONTROLLABLE TO THE FOREGROUND |
| TERMINATED | GRAY | ACTIVATE |

ENTER KEY

| COLOR OF STATUS INDICATOR BAR | STATUS |
|---|---|
| GRAY | TERMINATED |
| ORANGE | RUNNING (FOREMOST) |
| ORANGE | RUNNING (FOREMOST) |

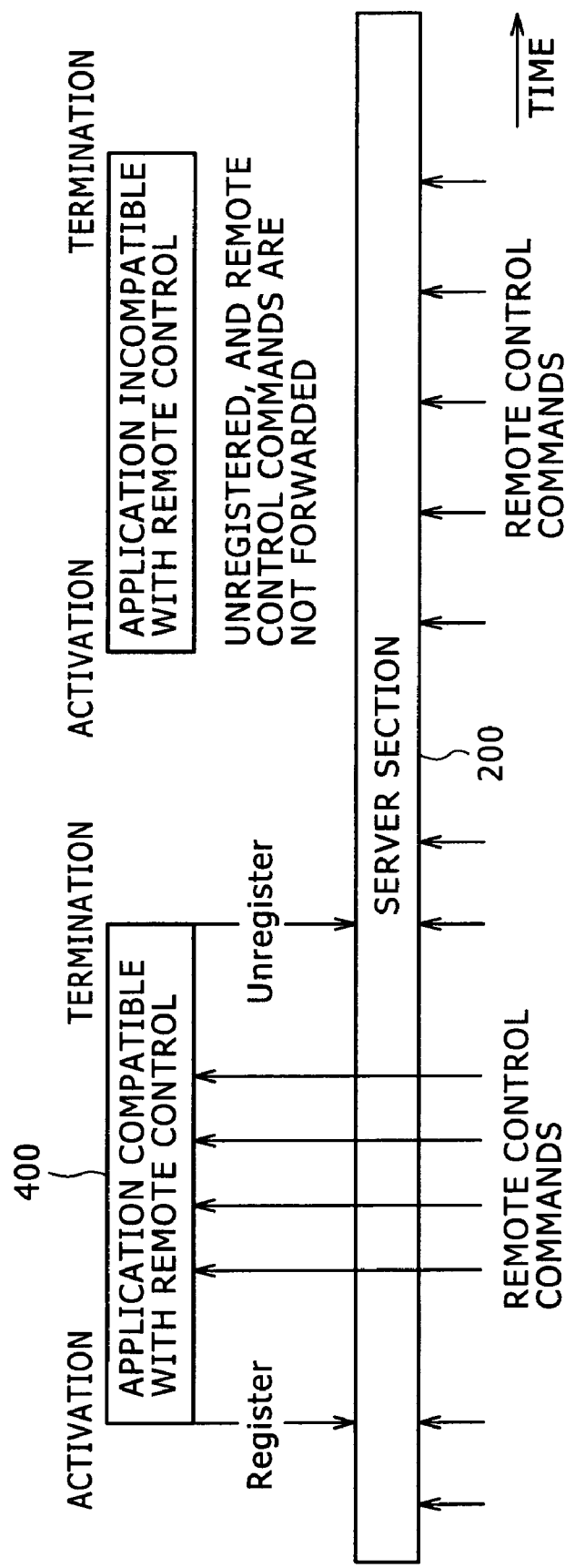

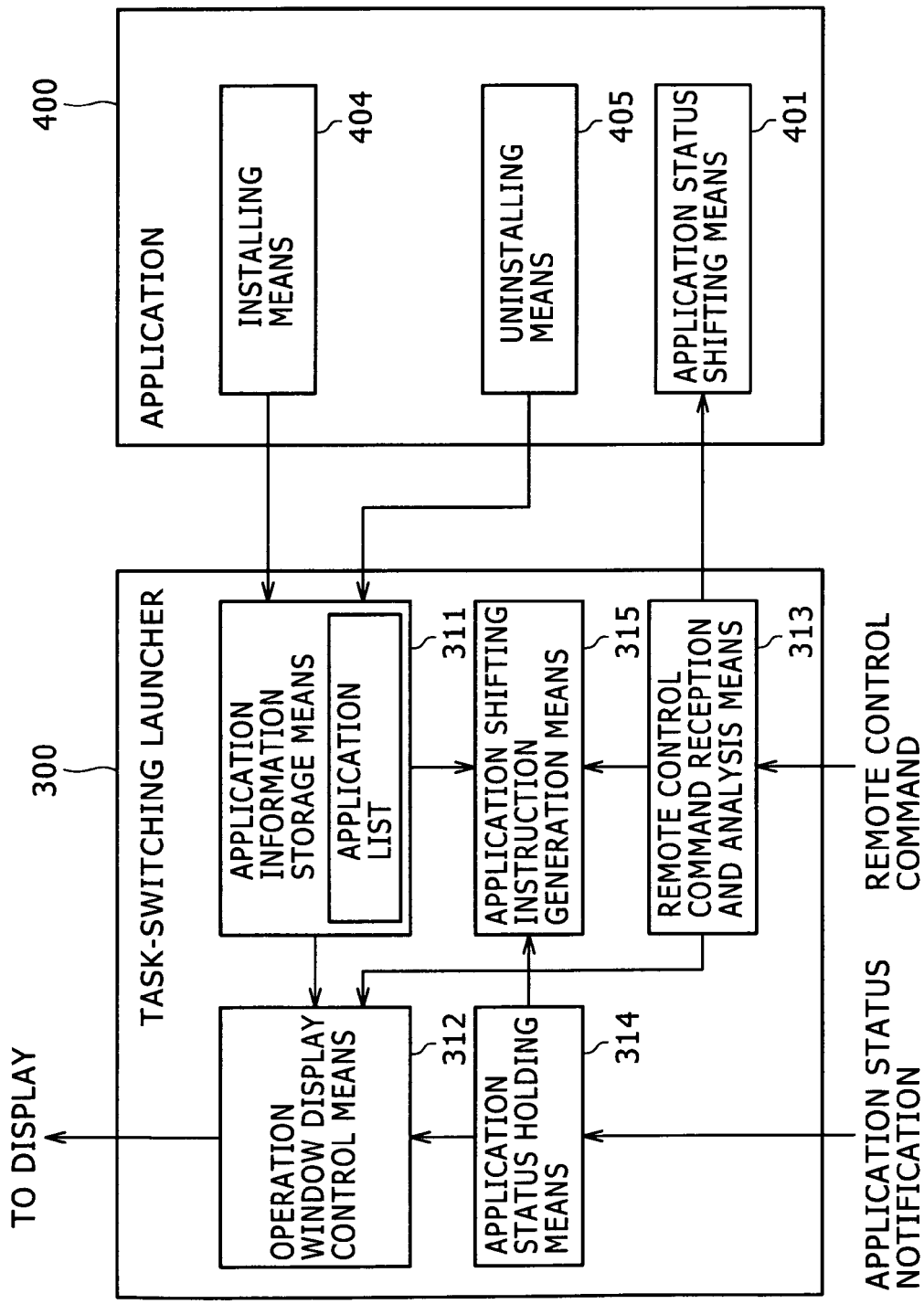

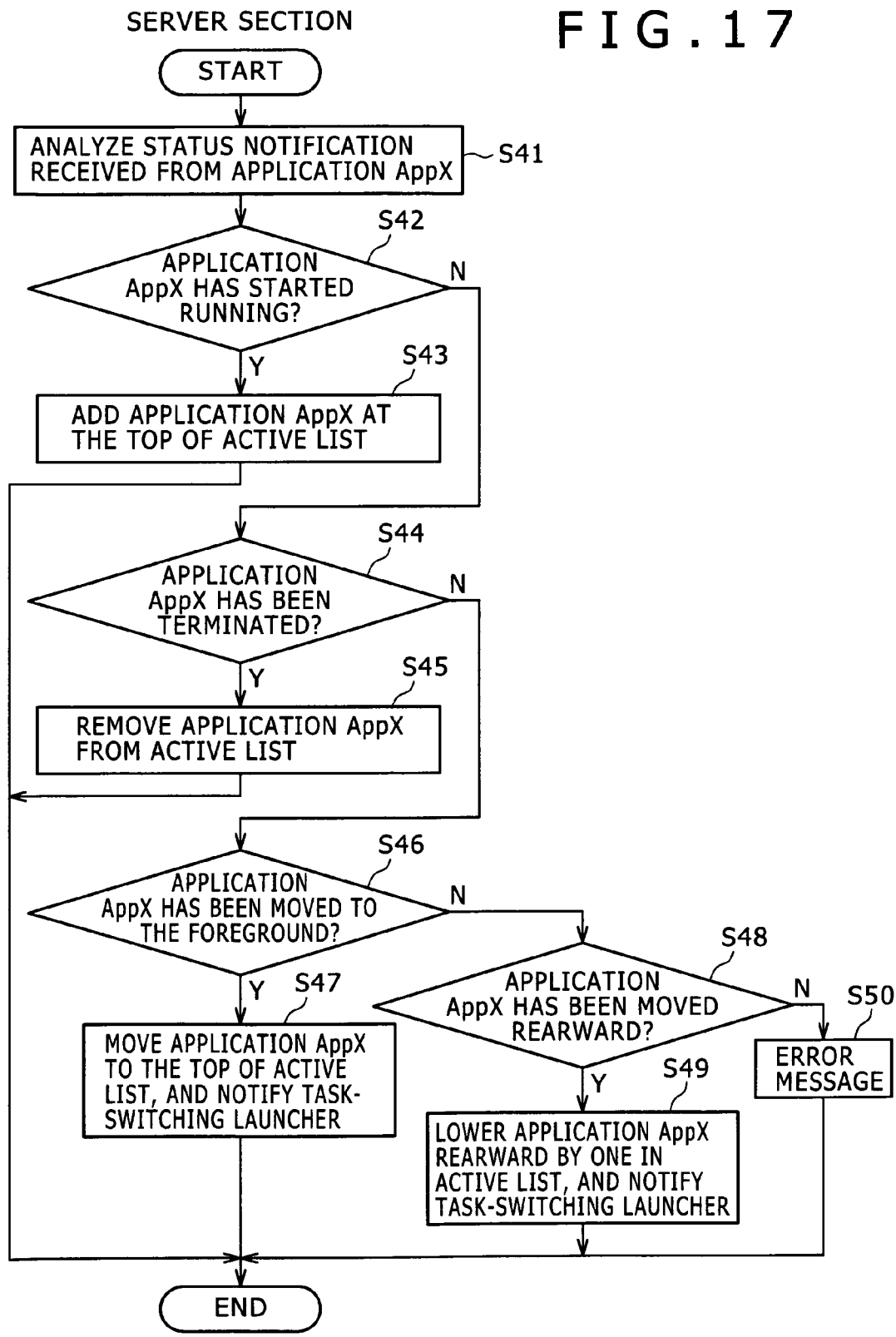

INTERFACE APPARATUS, INTERFACE METHOD IN INFORMATION PROCESSING APPARATUS, AND INTERFACE PROGRAM

CROSS-REFERENCE TO RELATED APPLICATIONS

The present invention application claims priority from Japanese Patent Application No. JP 2005-289506 filed on Oct. 3, 2005, the disclosure of which is hereby incorporated by reference herein.

BACKGROUND OF THE INVENTION

1. Field of the Invention

This invention relates to an interface apparatus and an interface method for controlling at least activation and termination of one or more application programs in accordance with user operations.

2. Description of the Related Art

At present, there is known a function (or software) called a "launcher" that is utilized in an information processing apparatus, such as a personal computer, for enabling a frequently-used application program registered previously to be activated promptly upon user request (see, for example, Japanese Patent Laid-open No. 2003-157140 and Japanese Patent Laid-open No. 2000-322185).

For example, in a launcher as used in a well-known operating system (OS), icons representing application programs registered in the launcher are displayed on a so-called toolbar, and when a user selects and clicks on one of the icons using a mouse, for example, the application program corresponding to the clicked-on icon is activated promptly.

Known launchers have the function of activating an application program promptly but do not have a function of recognizing a current status of a registered application program as their own function. At present, the current status of the application program is managed by a task manager.

As such, the known launchers have a problem of sometimes causing double activation of the same application program by launching an application program that has already been activated because of their inability to recognize the current status of the registered application program. Further, the known launchers do not have a function of terminating a running application program as their own function.

An advantage of this invention is to provide an interface apparatus that is capable of activating a registered application program promptly like a launcher and has overcome the above-mentioned problems.

SUMMARY OF THE INVENTION

In one embodiment of this invention, there is provided an interface apparatus that controls at least activation and termination of one or more registered application programs in accordance with user operations, the apparatus including first holding means configured to hold information of the one or more registered application programs; user operation acceptance means configured to accept the user operations; second holding means configured to receive and hold status information sent from each of the one or more application programs when the application program is activated or terminated; list presentation means configured to present on a display screen an application program list window showing a list of the one or more application programs based on the information held in the first holding means when the user operation acceptance means has accepted a user operation directing that the interface apparatus be activated, and to indicate in the application program list window at least whether a status of each application program is a running status or a terminated status based on the status information held in the second holding means; selection means configured to select an application program to be controlled from among the one or more application programs shown in the application program list window in accordance with a predetermined first user operation accepted by the user operation acceptance means; and control means configured to control the status of the selected application program based on the status information held in the second holding means when the user operation acceptance means has accepted a predetermined second user operation.

In the interface apparatus according to this embodiment of the invention, the second holding means holds information of the current status of the application programs, and based on this information, the current status of each application program is indicated in the application program list window to show it to a user.

While recognizing the status of each application program by viewing the application program list window, the user can perform the first user operation, such as a left/right specifying operation, an up/down specifying operation, or the like, to select an application program that he or she wishes to manipulate, the selection being achieved by the selection means.

Then, if the second user operation, such as an operation of an enter key or the like, is performed while a given application program is being selected, the selected application program will be activated (if it is in a terminated status) or terminated (if it is in a running state), for example, in accordance with the status of the selected application program held in the second holding means.

This invention makes it easy to select an application program from among a plurality of registered application programs and to terminate a running application program, instead of simply being capable of activating an application program.

BRIEF DESCRIPTION OF THE DRAWINGS

FIG. 5 is a diagram for explaining the interface apparatus according to one embodiment of this invention;

FIG. 8 is a diagram for explaining a processing operation of the parts of the interface apparatus shown in FIG. 7;

FIG. 10 is a more detailed functional block diagram of parts of the interface apparatus of FIG. 3;

FIG. 17 is a flowchart illustrating an operation procedure of the parts of the interface apparatus of FIG. 3.

DETAILED DESCRIPTION

Hereinafter, an interface apparatus and method according to one embodiment of this invention will be described with reference to the accompanying drawings. The embodiment described below refers to an exemplary case where a user operation input means is formed by a wireless remote control using, for example, infrared rays and the interface apparatus allows a plurality of different application programs to be manipulated by this remote control.

Figure 1:
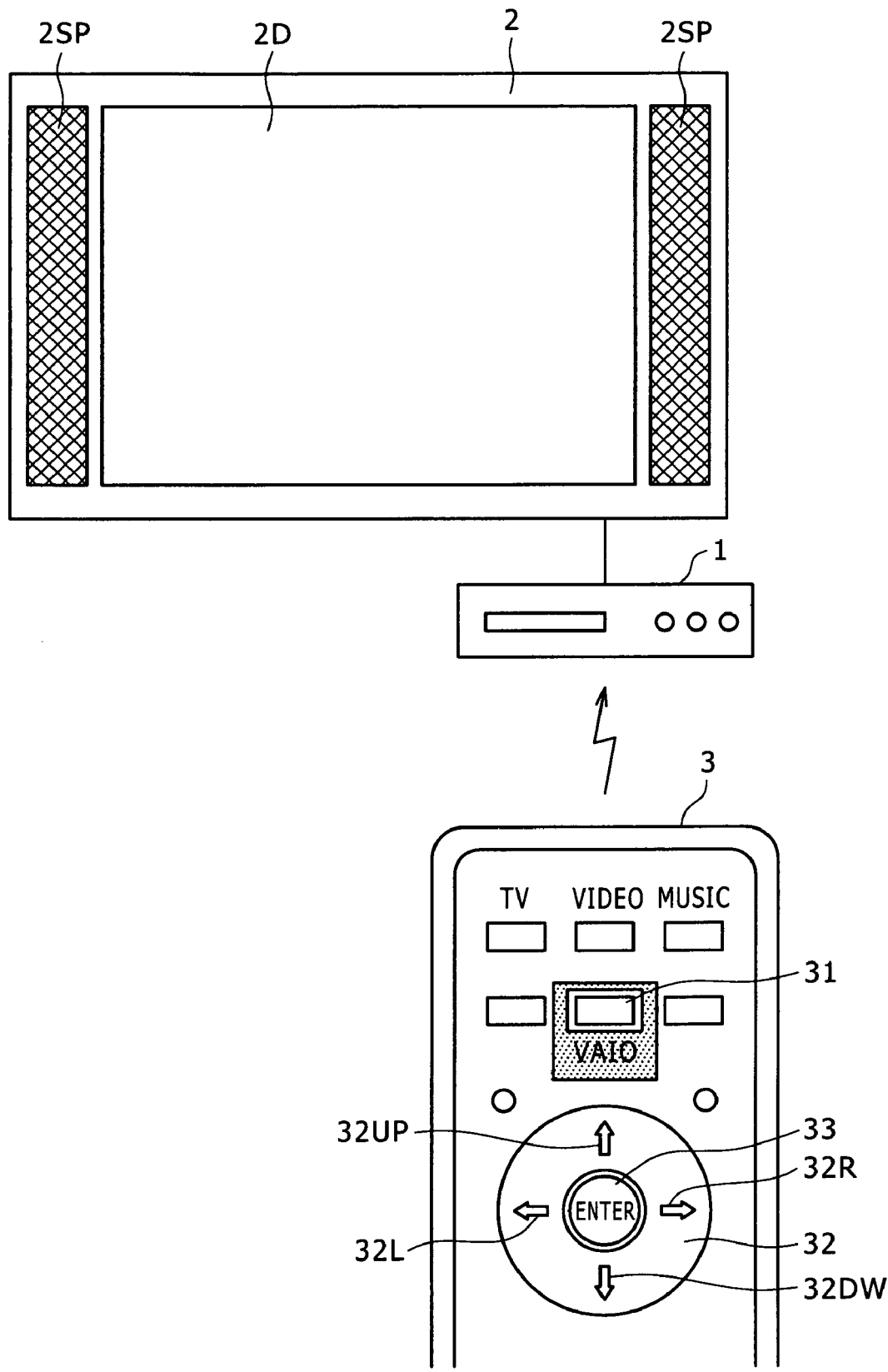
FIG. 1 is a diagram illustrating an exemplary configuration of an information processing system to which an interface apparatus according to one embodiment of this invention is applied.

FIG. 1 illustrates an exemplary configuration of an information processing system including the interface apparatus according to this embodiment. This exemplary information processing system includes an information processing apparatus 1, such as a personal computer, a display device 2 connected to the information processing apparatus 1, and a remote control transmitter 3 (hereinafter referred to as a "remote commander") of a remote control designed for the information processing apparatus 1.

In this example, the display device 2 is provided with a display screen 2D, such as a liquid crystal display (LCD), and a loudspeaker 2SP. The display device 2 receives display image information from the information processing apparatus 1 to display an interface window, a content image, etc., on the display screen 2D and also receives audio information from the information processing apparatus 1 to perform sound reproduction via the loudspeaker 2SP.

The information processing apparatus 1 includes a remote control receiver for receiving a remote control signal (which is in this example an infrared signal) from the remote commander 3, analyzes the received remote control signal to perform a process in accordance with the analysis, and controls display image output, audio output, and the like of the display device 2.

Figure 2:
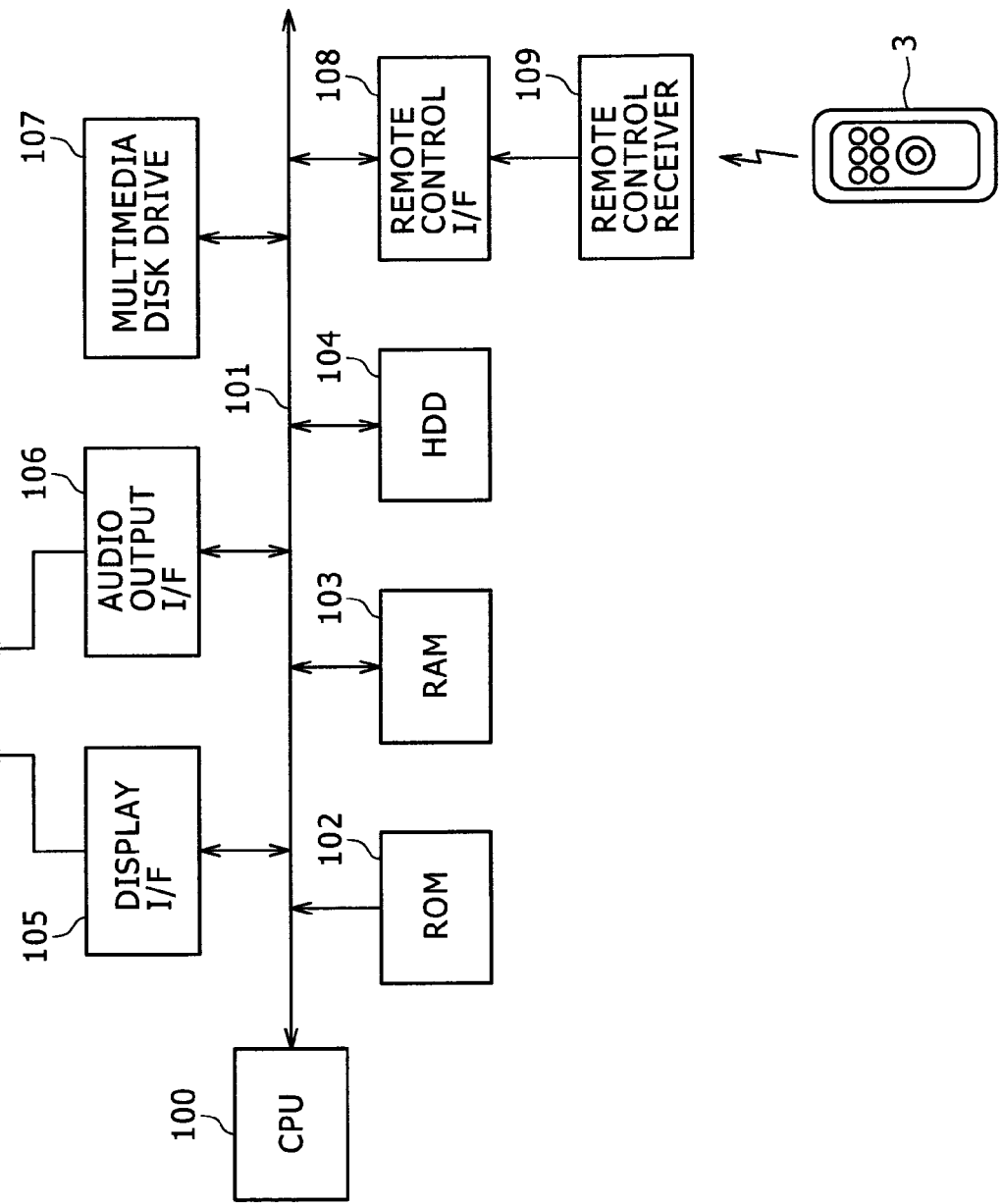
FIG. 2 is a block diagram illustrating an exemplary hardware structure of an information processing apparatus in the information processing system of FIG. 1.

FIG. 2 is a block diagram illustrating an exemplary hardware structure of the information processing apparatus 1. As shown in the figure, in the information processing apparatus 1 of this example, to a central processing unit (CPU) 100 are connected via a system bus 101 a read only memory (ROM) 102 in which a program is stored, a random access memory (RAM) 103 for a work area, a hard disk drive 104 as an information storage unit, a display interface 105, an audio output interface 106, and a multimedia disk drive 107 configured to perform reading and writing from and on disk media, such as a digital versatile disc (DVD) or a compact disc (CD).

In addition, a remote control interface 108 is connected to the system bus 101, and a remote control receiver 109 for receiving the remote control signal from the remote commander 3 is connected to the remote control interface 108.

The information processing apparatus 1 includes the interface apparatus according to this embodiment. The interface apparatus according to this embodiment is implemented by software, i.e., an application program stored in the ROM 102 or the hard disk drive 104, and has a functional structure as illustrated in FIG. 3.

Specifically, the interface apparatus of this embodiment includes, as functional blocks, a server section 200 and a launcher section 300 having a function of task switching (hereinafter referred to as a "task-switching launcher" for short), and controls the status of one or more application programs (hereinafter simply referred to as "applications" to facilitate explanation) registered in the task-switching launcher 300.

In this embodiment, applications 400 capable of being registered in the task-switching launcher 300 are assumed to be compatible with the remote control. When installed onto the information processing apparatus 1, the applications 400 are automatically registered in the task-switching launcher 300, and when uninstalled from the information processing apparatus 1, the applications 400 are automatically deleted from the task-switching launcher 300 as well.

Figure 3:
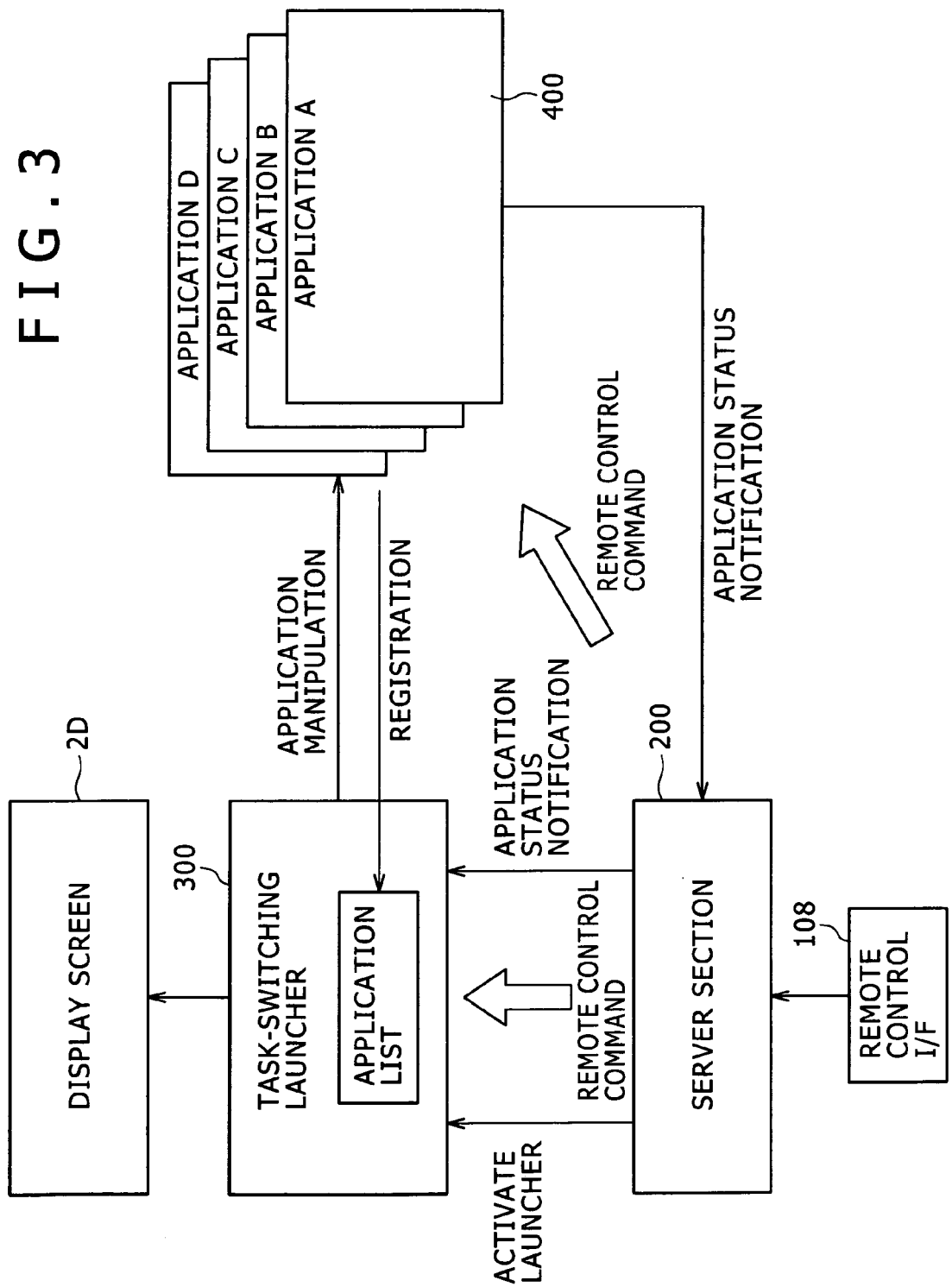
FIG. 3 is a functional block diagram illustrating an exemplary functional structure of the interface apparatus according to one embodiment of this invention.

In the example of FIG. 3, it is assumed that four applications A, B, C, and D are registered in the interface apparatus according to this embodiment. A list of the applications A, B, C, and D registered in the interface apparatus is held by the task-switching launcher 300 as will be described later.

The server section 200 receives the remote control signal via the remote control interface 108 and analyzes the remote control signal to control activation/termination of the task-switching launcher 300 and send a received remote control command to the running task-switching launcher 300. The server section 200 also sends a remote control command to a running application.

Note that, in this embodiment, a plurality of applications 400 can be running simultaneously, and operation windows APwd of the applications 400 are displayed on the display screen such that they are overlapped by one another in the depth direction. Also note that only the application 400 whose operation window APwd is the foremost of all the operation windows APwd is capable of receiving the remote control command and being manipulated by a user.

When activated, the task-switching launcher 300 opens its own operation window (i.e., a task-switching launcher window) Lwd and displays it on the display screen 2D. In this embodiment, the task-switching launcher window Lwd is typically open on the foreground of the display screen 2D. Therefore, while the task-switching launcher 300 is running, the task-switching launcher 300 is typically capable of being controlled and manipulated by the remote commander 3.

Figure 4:
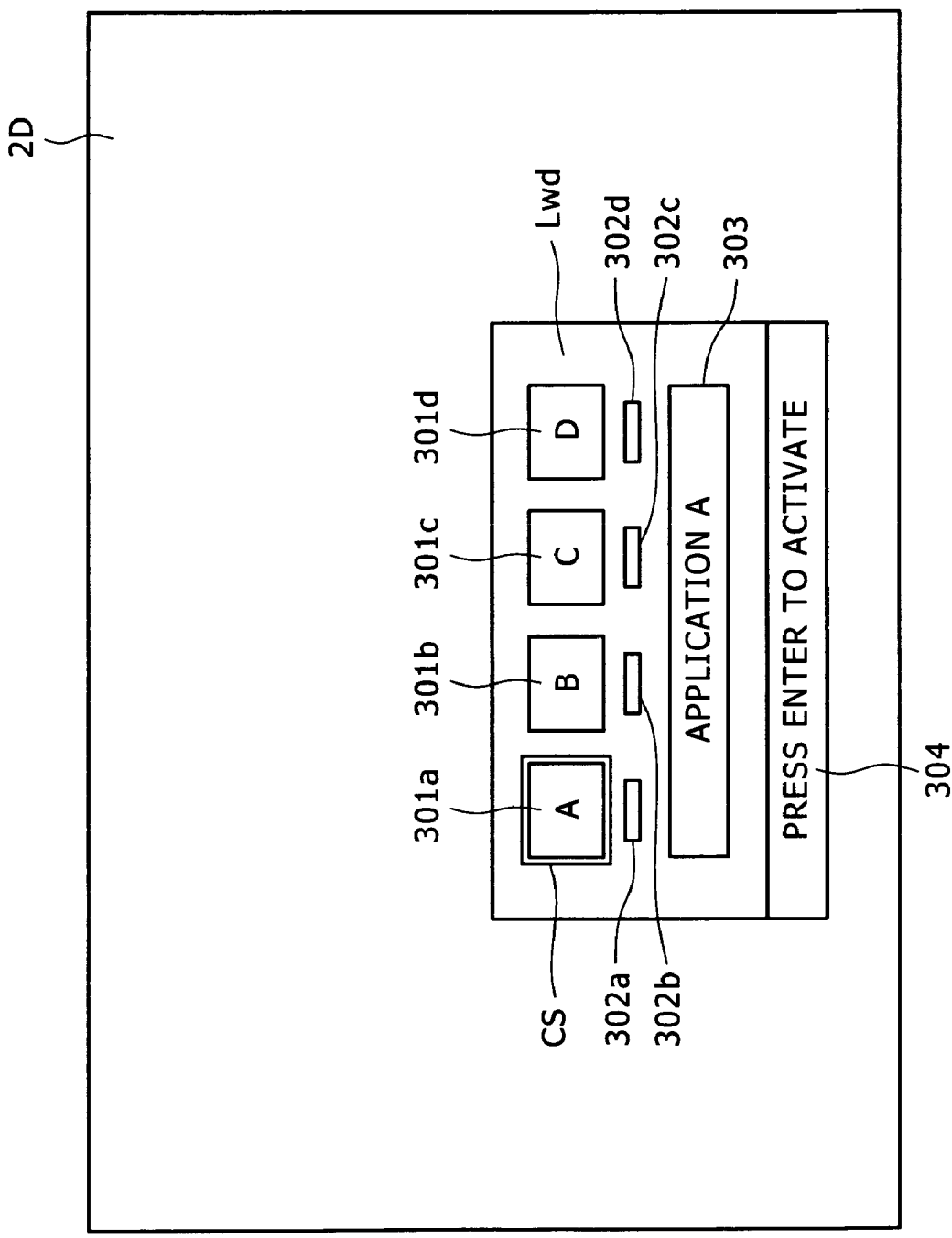
FIG. 4 is a diagram illustrating an exemplary user interface window in the interface apparatus according to one embodiment of this invention.

An example of the task-switching launcher window Lwd displayed is shown in FIG. 4. In the example of FIG. 4, the task-switching launcher window Lwd contains icons 301a, 301b, 301c, and 301d corresponding to the four applications A, B, C, and D, respectively. The task-switching launcher 300 shows the user which application 400 is currently selected for manipulation by a rectangular frame CS, for example, that encloses the icon of the selected application. The rectangular frame CS serves as a cursor to indicate the selected application and moves in accordance with a selected application changing operation by the user, as will be described later.

In addition, in this embodiment, as illustrated in FIG. 4, below the icons 301a, 301b, 301c, and 301d are provided status indicator bars 302a, 302b, 302c, and 302d, which indicate the status of the applications A, B, C, and D, respectively.

In this embodiment, the types of the status of the applications 400 include a "running" status and a "terminated" status. In addition, since of all applications 400 that are in the "running" status, only the application 400 whose operation window APwd is open on the foreground can be manipulated by the user's remote control in this embodiment, the "running" status is further divided into a "foremost" status and a "rearward" status.

In consequence, the status indicator bars 302a, 302b, 302c, and 302d need be capable of indicating the above three statuses in this example. As a mode of indicating the three statuses, color variation of the status indicator bars 302a, 302b, 302c, and 302d is utilized in this example.

The status indicator bars 302a, 302b, 302c, and 302d are displayed in different colors depending on the status of their corresponding application 400, such as: orange for the "running" and "open on the foreground" status; blue for the "running" and "open rearward" status; and gray for the "terminated" status.

Therefore, in this embodiment, a status indicator bar displayed in orange indicates that its corresponding application 400 is manipulable by the remote commander.

Status information of each of the applications A, B, C, and D is provided from the respective applications A, B, C, and D to the task-switching launcher via the server section 200.

As illustrated in FIG. 4, below the status indicator bars 302a, 302b, 302c, and 302d is provided an "application name display field" 303 for showing the user which application is currently selected.

Further, below the application name display field 303 is provided a "next status message display field" 304 for showing the user which status the currently selected application 400 will enter if the user performs an "application status change operation" (i.e., an operation to change the status of an application) on the currently selected application.

Viewing the display of the task-switching launcher window Lwd of FIG. 4, the user is able to select one of the applications 400 for manipulation and change the status of the selected application using the remote commander 3.

In this example, operation buttons of the remote commander 3 used for the task-switching launcher 300 are, as illustrated in FIG. 1, assumed to include three keys, i.e., an activation key 31 for activating the task-switching launcher 300, an up/down/left/right arrow key 32, and an enter key 33. In this example, a left arrow key 32L or a right arrow key 32R included in the up/down/left/right arrow key 32 is used for application selection, while the application status change operation is implemented by pressing the enter key 33.

Note that an up arrow key 32UP and a down arrow key 32DW included in the up/down/left/right arrow key 32 are not used for the task-switching launcher 300. The other, remaining keys are also not used for the task-switching launcher 300. In other words, although the server section 200 forwards all remote control commands to the task-switching launcher 300 while the task-switching launcher 300 is running, the task-switching launcher 300 ignores remote control commands that are based on operation of the keys other than the four keys, i.e., the activation key 31, the left arrow key 32L and right arrow key 32R in the up/down/left/right arrow key 32, and the enter key 33.

If the activation key 31 of the remote commander 3 is pressed by the user, the task-switching launcher 300 is activated, and the task-switching launcher 300 displays the task-switching launcher window Lwd as illustrated in FIG. 4 on the foreground of the display screen 2D. As a result, the task-switching launcher 300 becomes the object of operation and control by the remote commander 3, whereby all remote control commands from the remote commander 3 are forwarded by the server section 200 to the task-switching launcher 300.

If the left arrow key 32L or right arrow key 32R in the up/down/left/right arrow key 32 of the remote commander 3 is pressed by the user while the task-switching launcher 300 is running, the task-switching launcher 300, which receives a remote control command corresponding to that operation via the server section 200, determines the remote control command to be a command for selecting one of the applications 400 and moves the rectangular frame CS as a cursor in a specified direction, thereby changing the selected application 400.

The change in the selected application 400 involves a change in the application name indicated in the application name display field 303. The change in the selected application 400 will also involve a change in the content of the next status message display field 304 unless the status of the newly selected application 400 is the same as that of the formerly selected application 400.

FIG. 5 illustrates a relationship between each status, the color of the status indicator bar, and the next status message display field 304.

As mentioned above, in this example, the application status change operation is implemented by pressing of the enter key 33. If the user presses the enter key 33 of the remote commander 3 while the task-switching launcher 300 is running, a remote control signal corresponding to that operation is forwarded via the server section 200 to the task-switching launcher 300, and the task-switching launcher 300 shifts the status of the selected application 400 to a next status that is uniquely determined based on the current status.

In accordance with this status shift, the task-switching launcher 300 receives a status notification from the application 400 via the server section 200, and changes the color of the status indicator bar in the task-switching launcher window Lwd, thereby showing the user the change in the status.

Figure 6:
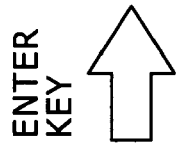
FIG. 6 is a diagram for explaining the interface apparatus according to one embodiment of this invention.

FIG. 6 illustrates how the color of the status indicator bar will change when the enter key 33 is pressed as well as the statuses corresponding to the colors. Specific examples of the above-mentioned shift of the status of the selected application to the next status that is uniquely determined based on the current status are presented below.

First, in the case where an application 400 whose current status is the "terminated" status (in which case, the corresponding status indicator bar is gray in color) is selected and the enter key 33 is pressed, that application 400 is activated and the operation window SPwd thereof is displayed on the foreground of the display screen 2D, and the status thereof is shifted to the "running (foremost)" status (i.e., the color of the corresponding status indicator bar is changed to orange).

Second, in the case where an application 400 whose current status is the "running (foremost)" status (in which case, the corresponding status indicator bar is orange in color) is selected and the enter key 33 is pressed, that application 400 is terminated and the status thereof is shifted to the "terminated" status (i.e., the color of the corresponding status indicator bar is changed to gray).

Third, in the case where an application 400 whose current status is the "running (rearward)" status (in which case, the corresponding status indicator bar is blue in color) is selected and the enter key 33 is pressed, the operation window SPwd of that application 400 is moved to the foreground and the status thereof is shifted to the "running (foremost)" status (i.e., the color of the corresponding status indicator bar is changed to orange).

Fourth, in this embodiment, if an application 400 whose current status is the "terminated" status (in which case, the corresponding status indicator bar is gray in color) is activated by the pressing of the enter key, the operation window SPwd of that activated application 400 is displayed on the foreground, the status thereof is shifted to the "running (foremost)" status (i.e., the color of the corresponding status indicator bar is changed to orange), and that application becomes manipulable by the remote control. As a result, although not shown in FIG. 5, the status of the application 400 whose status was the "running (foremost)" status (in which case, the corresponding status indicator bar is orange in color) before the pressing of the enter key is shifted to the "running (rearward)" status (i.e., the color of the corresponding status indicator bar is changed to blue).

Next, regarding the interface apparatus of this embodiment having the three functional blocks as illustrated in FIG. 3, operations performed by each two functional blocks in conjunction with each other will be described in turn.

[Operation Performed by the Server Section 200 and the Application 400 in Conjunction with Each Other]

Figure 7:
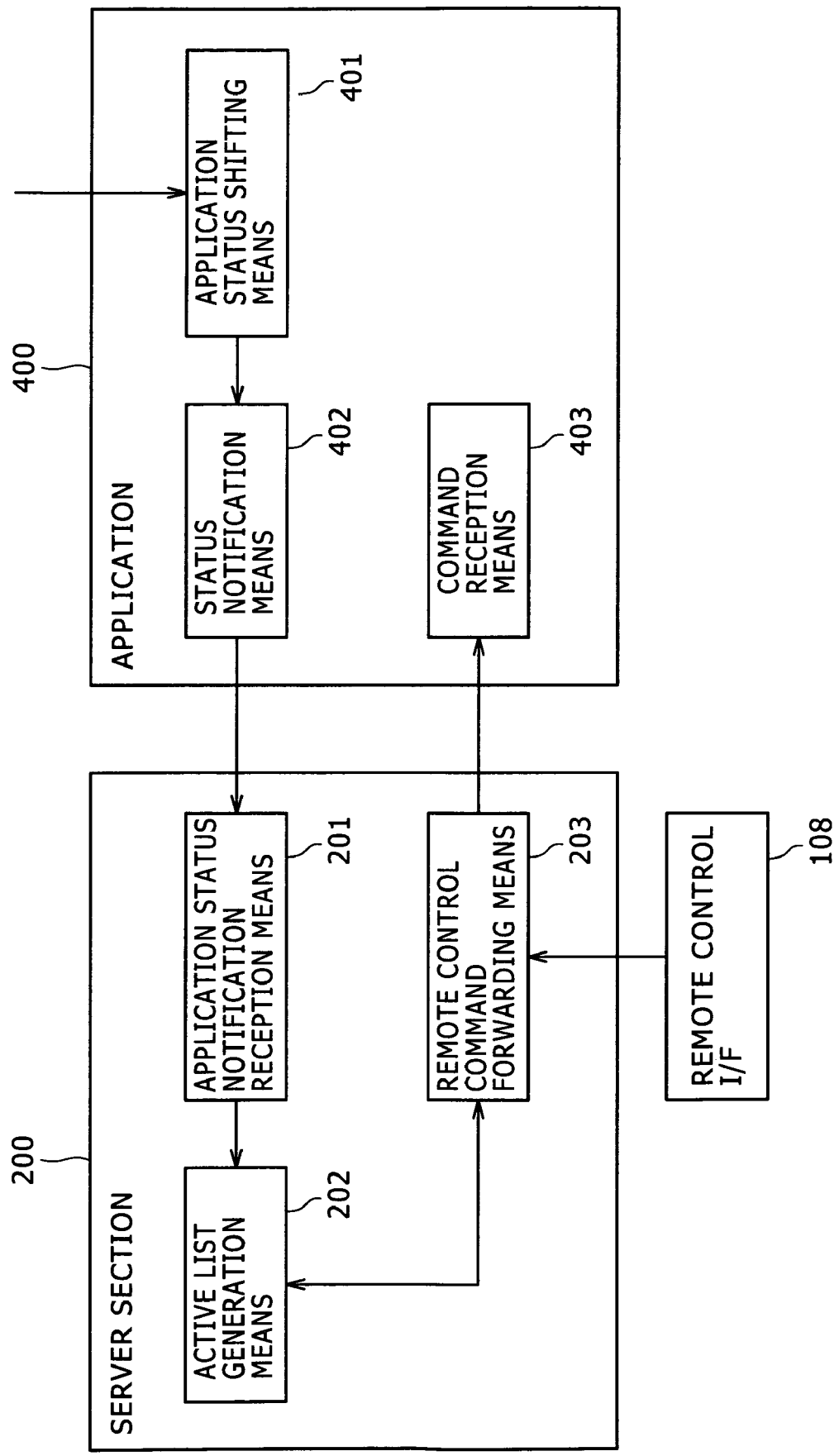
FIG. 7 is a more detailed functional block diagram of parts of the interface apparatus of FIG. 3.
Figure 9A:
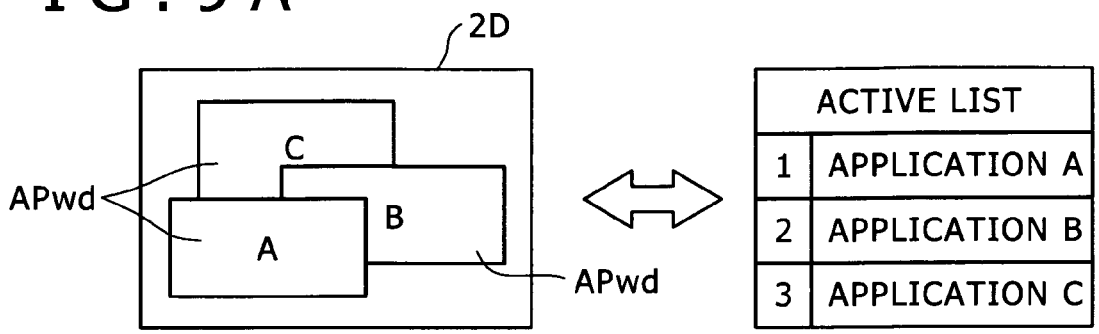
FIG. 9 is a diagram for explaining a processing operation of the parts of the interface apparatus shown in FIG. 7.
Figure 9B:
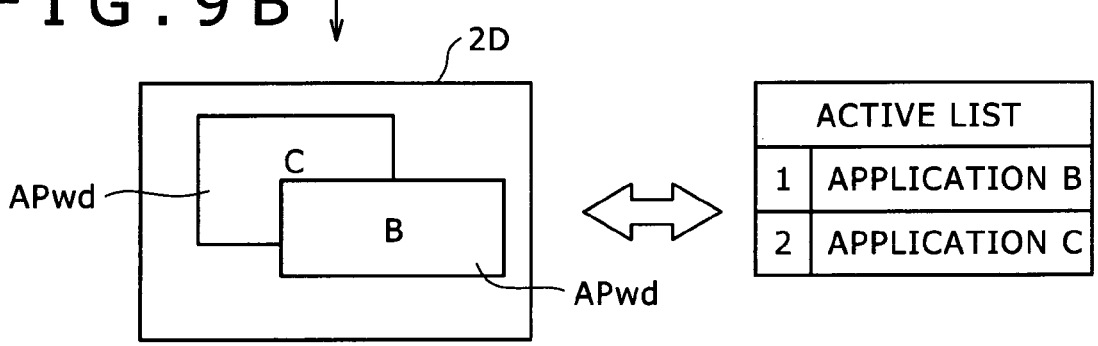
Figure 9C:
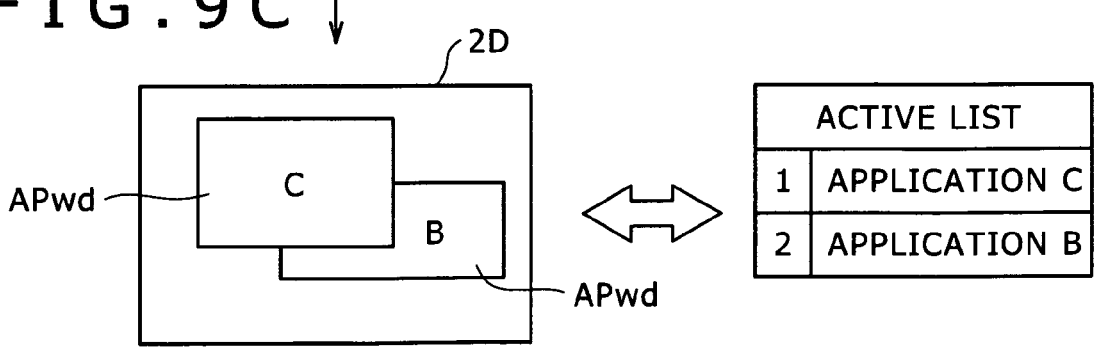
Figure 9D:
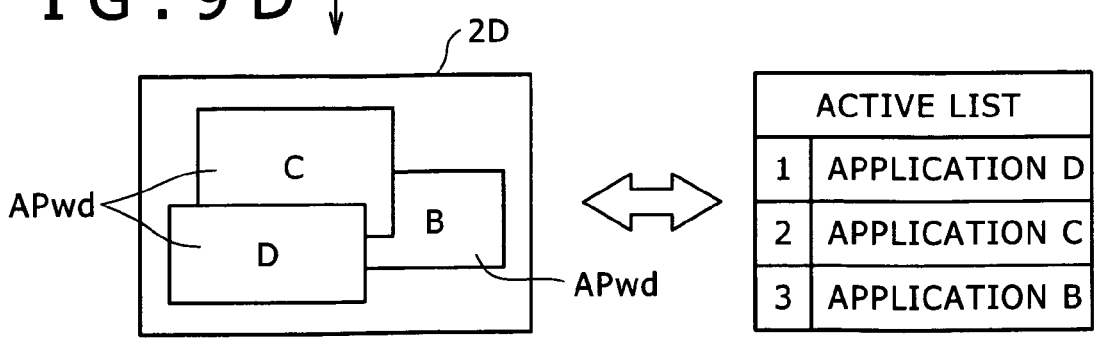

FIG. 7 is a diagram for explaining an operation performed by the server section 200 and the application 400 in conjunction with each other, and this is a functional block diagram showing processing functions of the server section 200 and the application 400 as blocks.

Upon receipt of a shifting instruction from the task-switching launcher 300, application status shifting means 401 of the application 400 "activates" the application 400 out of the "terminated" status or shifts the status thereof from the "running (rearward)" status to the "running (foremost)" status. In addition, the application status shifting means 401 shifts the status of the application 400 from the "running (foremost)" status to the "terminated" status. It should be appreciated that the status shift from the "running (rearward)" status to the "running (foremost)" status occurs not only when the shifting instruction has been received from the task-switching launcher 300, but the application 400 itself causes such a status shift by a timer, for example.

After shifting the status of the corresponding application, the application status shifting means 401 notifies status notification means 402 of the new status after the shifting. The status notification means 402 sends to the server section 200 information of the new status as an application status notification.

The server section 200 holds the content of such an application status notification on an application-by-application basis. The server section 200 uses application status notification reception means 201 to receive the application status notification from the application 400, and sends it to active list generation means 202. The active list generation means 202 generates a list of running applications 400 (i.e., an active list) based on the received application status notifications.

Referring now to FIG. 8, when activated, the application 400 sends "Register" to the server section 200 as the application status notification. Upon receipt of the application status notification "Register", the server section 200 registers the application 400 that has sent the application status notification in the active list.

As illustrated in FIG. 8, when terminated, the application 400 sends "Unregister" to the server section 200 as the application status notification. Upon receipt of the application status notification "Unregister", the server section 200 deletes from the active list the application 400 that has sent the application status notification.

When the application 400 is running and the operation window thereof is on the foreground (immediately after activation, the operation window of the activated application is always displayed on the foreground), the server section 200 sends all remote control commands from the remote commander 3 to the application 400 that is running on the foreground. In this manner, the application 400 becomes manipulable by the user using the remote commander 3.

Note that, as illustrated in FIG. 8, an application that is incompatible with the remote control does not generate the application status notification even when it is activated, nor is it registered in the active list of the server section 200. The remote control commands are not sent to the application that is incompatible with the remote control even when it is running on the foreground.

With reference to FIG. 9, examples of the active list will now be described. In the case where, as shown in (A) of FIG. 9, the operation windows APwd of the applications A, B, and C are displayed with the application A in the foremost position, the application C in the rearmost position, and the application B in an intermediate position between them, the applications will be listed in the active list in the order of (from the top) the application A, the application B, and the application C, as shown on the right-hand side of the figure.

If, from the situation of (A) of FIG. 9, the application A is terminated so that the operation window APwd of the application A disappears from the display screen 2D as illustrated in (B) of FIG. 9, the application A is deleted from the active list so that the application B moves to the top and the application C moves to the second position in the active list.

Next, if, from the situation of (B) of FIG. 9, the operation window APwd of the application C is moved to the foreground to take the place of that of the application B based on an instruction to move to the foreground or a demand to move to the foreground originating from the application C itself as illustrated in (C) of FIG. 9, the application C moves to the top in the active list and the application B moves to the second position.

Next, if, from the situation of (C) of FIG. 9, the application D is activated as illustrated in (D) of FIG. 9, the application D activated is registered at the top in the active list and the applications B and C move to the third and second positions sequentially.

If remote control command forwarding means 203 of the server section 200 receives the remote control command, it refers to the active list generated in the active list generation means 202 and, determining the application 400 registered at the top in the active list to be the application whose operation window APwd is being displayed on the foreground, sends the remote control command to that application 400. The application 400 executes a process specified by the received remote control command.

[Operation Performed by the Task-switching Launcher 300 and the Application 400 in Conjunction with Each Other]

FIG. 10 is a diagram for explaining an operation performed by the task-switching launcher 300 and the application 400 that is compatible with the remote control in conjunction with each other, and this is a functional block diagram showing processing functions of the task-switching launcher 300 and the application 400 as blocks.

The application 400 that is compatible with the remote control is installed onto the information processing apparatus 1 using installing means 404. At the time of installing, the installing means 404 writes the following registration information into the task-switching launcher 300 as information regarding the application 400 to be registered in the task-switching launcher 300:

The name of the application 400;
A path of the application 400 for activation;
A path of the application 400 for termination;
An option at the time of activation;
An option at the time of termination;

An option when making the application 400 the object of manipulation;

A file containing an icon (an icon file); and

The number of the icon to be displayed (an icon identifier).

The task-switching launcher 300 stores and holds the above registration information in application information storage means 311. In such a manner, the application information storage means 311 holds the list of registered applications (i.e., an application list).

Meanwhile, uninstalling means 405 is used to uninstall the application 400 that is compatible with the remote control from the information processing apparatus 1. At the time of uninstalling, the uninstalling means 405 deletes the registration information of the corresponding application 400, which has been stored in the application information storage means 311 of the task-switching launcher 300.

The task-switching launcher 300 also includes operation window display control means 312, remote control command reception and analysis means 313, application status holding means 314, and application shifting instruction generation means 315.

The remote control command reception and analysis means 313 receives the remote control command forwarded from the server section 200 and analyzes it. If the analysis of the received remote control command determines that it is a command to activate the task-switching launcher, although not shown in FIG. 10, the remote control command reception and analysis means 313 notifies each component of the task-switching launcher 300 (i.e., the application information storage means 311, the operation window display control means 312, the application status holding means 314, and the application shifting instruction generation means 315) of that fact and activates the task-switching launcher 300.

At the time of activation of the task-switching launcher 300, information of the active list is sent from the server section 200 as the application status notification. The application status holding means 314 receives and holds that information.

When notified of the activation of the task-switching launcher, the operation window display control means 312 generates display information of the task-switching launcher window Lwd based on the information of the application list obtained from the application information storage means 311 and the status information of each application obtained from the application status holding means 314, and supplies the display information to the display device 2 to display the task-switching launcher window Lwd on the foreground of the display screen 2D.

Referring to the task-switching launcher window Lwd displayed on the display screen 2D and using the remote commander 3, the user performs an application selection operation by pressing of the left arrow key 32L or the right arrow key 32R or an entering operation by pressing of the enter key as described above. Because the remote control command corresponding to such a user operation is sent to the task-switching launcher 300 via the server section 200, the remote control command reception and analysis means 313 receives and analyzes the remote control command, and information of the analysis is sent to the operation window display control means 312 and the application shifting instruction generation means 315.

When the operation window display control means 312 receives information regarding the application selection operation from the remote control command reception and analysis means 313, it moves the rectangular frame CS as a cursor for indicating the selected application 400 in a direction specified by the information regarding the application selection operation, and also changes the contents of the application name display field 303 and the next status message display field 304 in accordance with the application 400 that becomes selected as a result of the movement of the rectangular frame CS, as described previously.

If the application shifting instruction generation means 315 receives information of the entering operation (i.e., an enter command) from the remote control command reception and analysis means 313, it refers to the application status information held in the application status holding means 314 to recognize the current status of the selected application 400. The application shifting instruction generation means 315 generates a command to give an instruction to shift to the next status, which is determined based on the recognized current status as described previously, and supplies the command to the corresponding, selected application 400.

At this time, the application shifting instruction generation means 315 refers to, as necessary, "Path of the application 400 for activation", "Path of the application 400 for termination", "Option at the time of activation", "Option at the time of termination", or the like contained in the registration information of the selected application held in the application information storage means 311, and performs processing in accordance with such information.

Further, in this embodiment, in the case where a plurality of applications 400 are running concurrently, when the enter command causes an additional application 400 to be activated, one of the running applications 400 to be terminated, or one of the applications 400 whose operation window APwd is arranged rearward to be moved to the foreground, one of the applications 400 whose operation window APwd is arranged rearward is moved to the foreground or the application 400 whose operation window APwd is arranged on the foreground is moved rearward.

Therefore, the application shifting instruction generation means 315 of the task-switching launcher 300 also sends, to a relevant application 400, a status shifting instruction concerning such movement of the operation window APwd in the depth direction in the display screen 2D. If the application 400 receives such a status shifting instruction, the application 400 provides the status notification to the server section 200.

If the operation window display control means 312 receives the information of the entering operation from the remote control command reception and analysis means 313, it refers to the application status information held in the application status holding means 314 to recognize the current status of the selected application 400 and, if the recognized current status is the "terminated" status or the "running (foremost)" status, closes the task-switching launcher window Lwd immediately.

Meanwhile, in the case where the recognized current status of the selected application is the "running (rearward)" status, the operation window display control means 312 waits for a predetermined time and, if no remote control command has come when the predetermined time has elapsed, closes the task-switching launcher window Lwd. The reason for this waiting is that, as the next status of the "running (rearward)" status is the "running (foremost)" status, there is a likelihood that the enter key will be pressed again after the selected application has entered the "running (foremost)" status to terminate the selected application. Therefore, the task-switching launcher is terminated after waiting for a time in which the user might perform an additional entering operation.

In other words, the user can terminate an application whose current status is the "running (rearward)" status by performing the application selection operation to select that application and thereafter operating the enter key twice in succession.

After issuing such an application status shifting instruction in response to the entering operation by the user as described above, the task-switching launcher 300 is terminated. In addition, without performing the entering operation, it is possible to terminate the task-switching launcher 300 by pressing the activation key 31 of the remote commander 3 once again when the task-switching launcher 300 is running.

Note that the task-switching launcher 300 is configured to recognize, upon activation, the statuses of all applications registered in the task-switching launcher 300 by acquiring the active list from the server section 200. However, the status of any application may change while the task-switching launcher 300 is running.

This happens when, as described previously, an application 400 in the "running (rearward)" status, by itself, makes a demand to enter the "running (foremost)" status to make itself controllable by the remote control command.

In this case, the application status information held in the application status holding means 314 is updated by the status notification, which is sent from the application 400 to the task-switching launcher 300 via the server section 200 even while the task-switching launcher 300 is running.

[Operation Performed by the Task-switching Launcher 300 and the Server Section 200 in Conjunction with Each Other]

Figure 11:
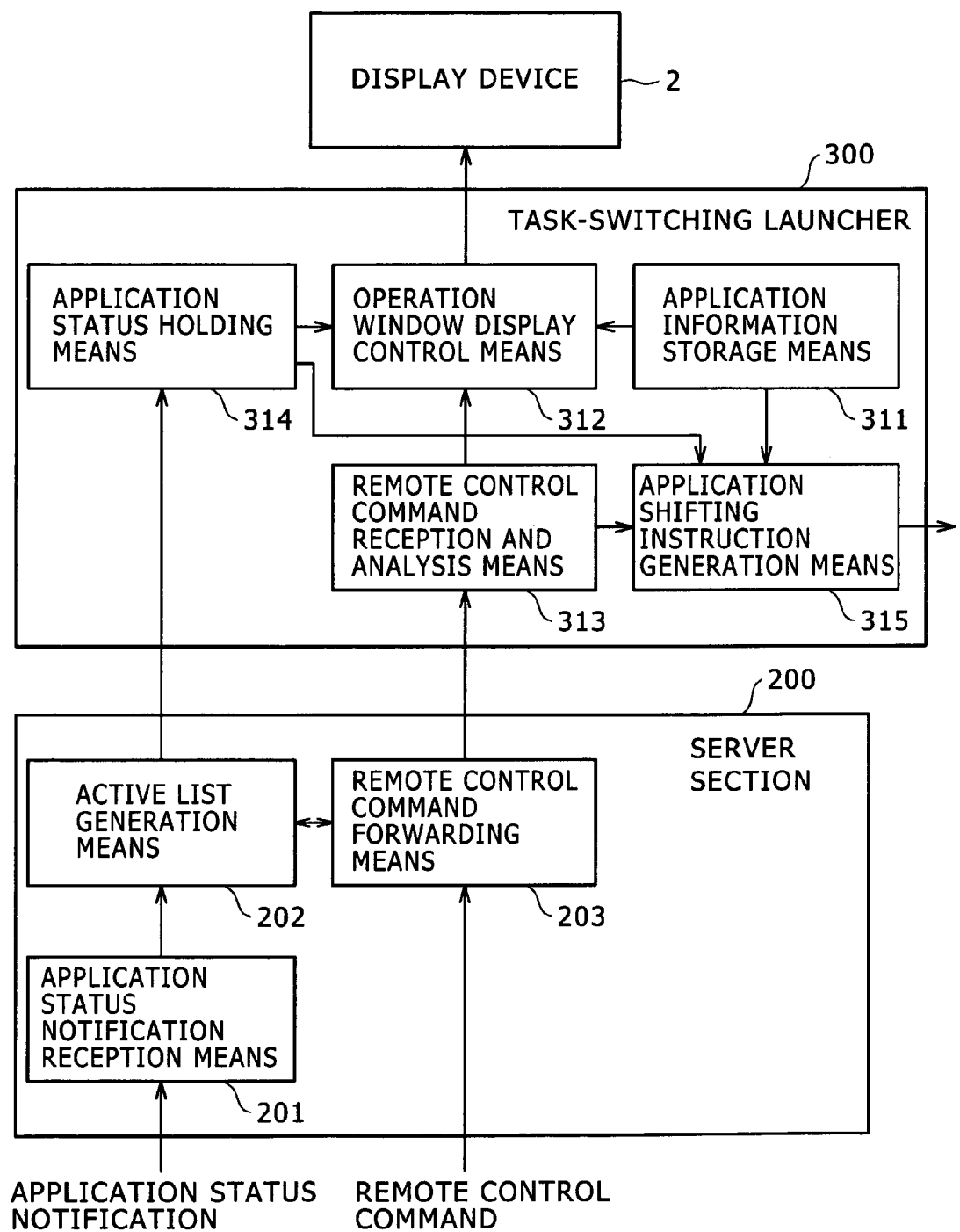
FIG. 11 is a more detailed functional block diagram of parts of the interface apparatus of FIG. 3.

FIG. 11 is a diagram for explaining an operation performed by the task-switching launcher 300 and the server section 200 in conjunction with each other, and this is a functional block diagram showing processing functions of the task-switching launcher 300 and the server section 200 as blocks.

The server section 200 uses the remote control command forwarding means 203 to receive the remote control command via the remote control interface 108. In the case where the remote control command is the command to activate the task-switching launcher 300, the remote control command forwarding means 203 sends this activation command to the task-switching launcher 300. The task-switching launcher 300 uses the remote control command reception and analysis means 313 to receive the activation command and activates the task-switching launcher 300 in the above-described manner.

While the task-switching launcher 300 is running, the remote control command forwarding means 203 of the server section 200 forwards all remote control commands to the task-switching launcher 300.

The task-switching launcher 300 receives those remote control commands at the remote control command reception and analysis means 313 but discards and does not handle remote control commands other than the left direction command based on the user's operation of the left arrow key 32L, the right direction command based on the user's operation of the right arrow key 32R, the enter command based on the user's operation of the enter key 33, and the termination command based on the activation key 31 as described previously.

When the task-switching launcher 300 has been activated, the server section 200 uses the active list generation means 202 to generate the active list and sends it to the task-switching launcher 300. As described previously, the task-switching launcher 300 uses the application status holding means 314 to receive and hold the information of the active list.

When the server section 200 receives the status notification from any application 400 at the application status notification reception means 201, the status notification is passed to the active list generation means 202. As described previously, the active list generation means 202 updates the active list in accordance with the received application status notification and, if the task-switching launcher 300 is running, provides the received application status notification to the task-switching launcher 300.

If the application status holding means 314 of the task-switching launcher 300 receives the application status notification, it updates the application status information in accordance with the received application status notification. As described previously, the status notification received at this time is one that notifies that the current status of the application has shifted from the "running (rearward)" status to the "running (foremost)" status.

[Processing Operation of the Task-switching Launcher 300]

Figure 12:
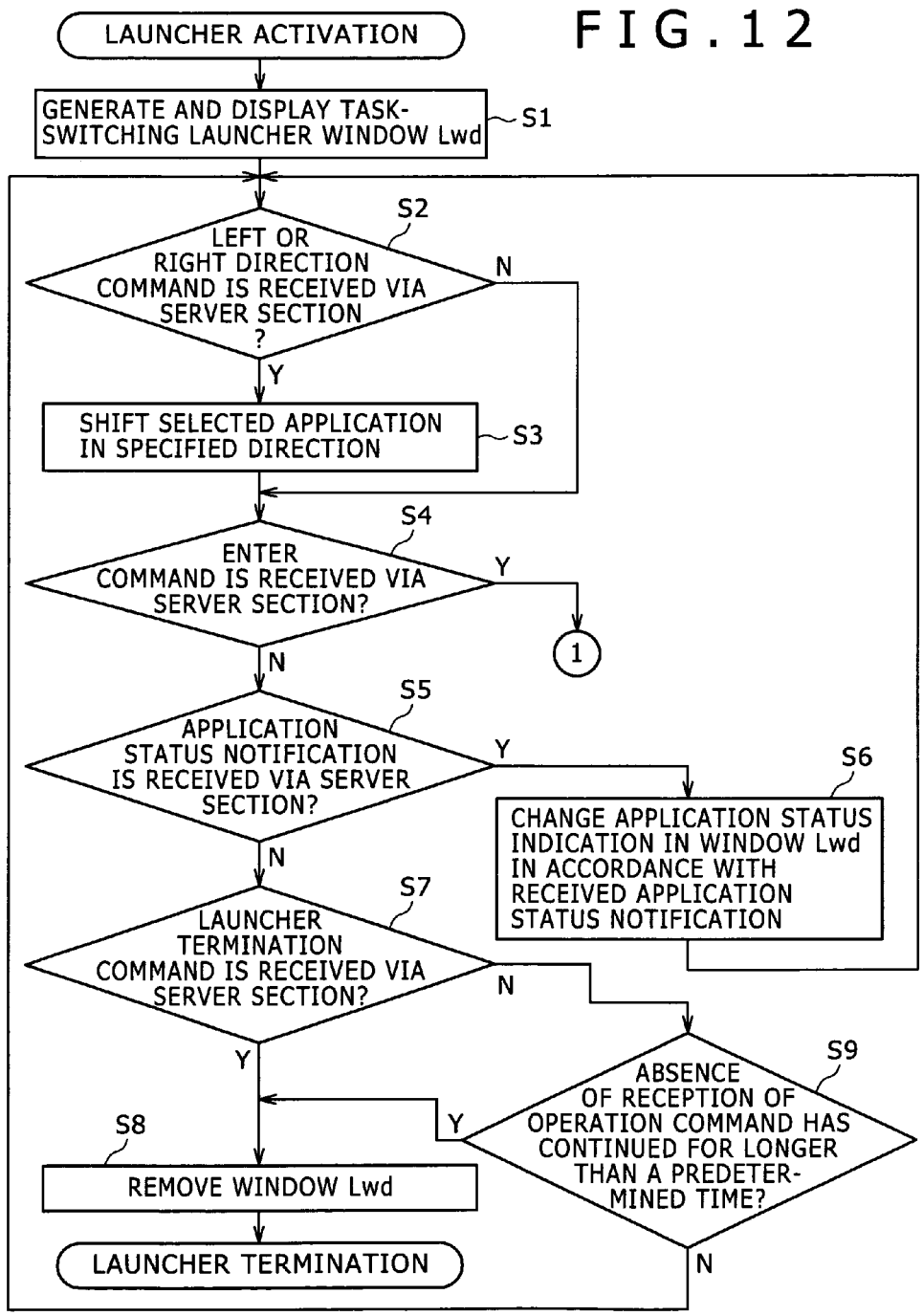
FIG. 12 is a flowchart illustrating a part of an operation procedure of the parts of the interface apparatus of FIG. 3.

Next, a processing operation in the task-switching launcher 300 will be described with reference to flowcharts of FIGS. 12 to 14 and exemplary displays in the task-switching launcher window Lwd of FIG. 15.

As described previously, the task-switching launcher 300 is activated based on the activation command from the server section 200. Upon activation, the task-switching launcher 300 starts a processing routine with "LAUNCHER ACTIVATION" of FIG. 12.

First, the task-switching launcher 300 generates the task-switching launcher window Lwd and displays it on the foreground of the display screen 2D (step S1). In this step S1, the task-switching launcher 300 receives the information of the active list from the server section 200 and holds the information in the application status holding means 314. Then, based on the registration information of the registered applications 400, which are compatible with the remote control, held in the application information storage means 311 and the status information of the applications 400 held in the application status holding means 314, the task-switching launcher window Lwd is generated as described previously.

Next, the task-switching launcher 300 determines whether or not the left direction command or the right direction command has been received via the server section 200 (step S2). If it is determined that the left direction command or the right direction command has been received, the task-switching launcher 300 causes the rectangular frame CS that encloses and indicates the selected application in the window Lwd to move in the direction specified by the received command and, in accordance with the change in the selected application, changes the displayed contents of the application name display field 303 and the next status message display field 304 (step S3).

Figure 15:
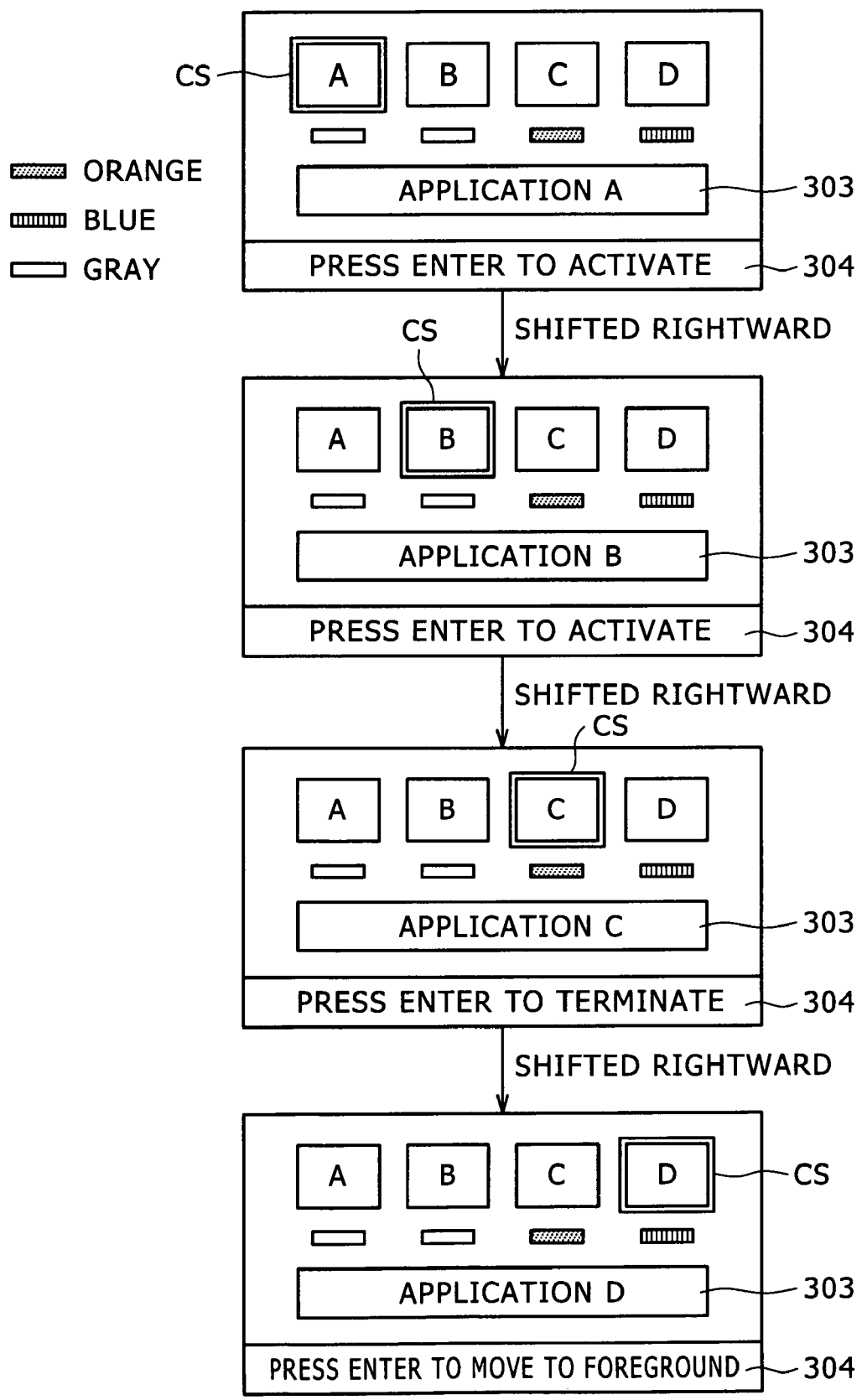
FIG. 15 is exemplary displays in a task-switching launcher window according to one embodiment of this invention.

An example of how the display in the task-switching launcher window Lwd is changed in accordance with the change in the selected application 400 at this time is shown in FIG. 15.

If it is determined at step S2 that neither the left direction command nor the right direction command has been received, or after step S3, the task-switching launcher 300 determines whether the enter command has been received via the server section 200 (step S4).

If it is determined at this step S4 that the enter command has not been received, the task-switching launcher 300 determines whether the application status notification has been received via the server section 200 (step S5) and, if it is determined that the application status notification has been received, changes the color of the status indicator bar of the corresponding application and the content of the next status message display field 304 in the window Lwd in accordance with the status of the application after the status notification (step S6). Thereafter, control returns to step S2.

If it is determined at step S5 that no application status notification has been received, the task-switching launcher 300 determines whether the termination command for the task-switching launcher has been received via the server section 200 (step S7) and, if it is determined that the termination command for the task-switching launcher has been received, removes the task-switching launcher window Lwd from the display screen 2D and is terminated (step S8).

Meanwhile, if it is determined at step S7 that the termination command for the task-switching launcher has not been received, the task-switching launcher 300 determines whether absence of reception of any remote control command has continued for longer than a predetermined time, e.g., 5 seconds (step S9) and, if it is determined that the absence has continued longer than the predetermined time, removes the task-switching launcher window Lwd from the display screen 2D and is terminated (step S8).

Meanwhile, if it is determined at step S9 that the absence of reception of any remote control command has not continued for longer than the predetermined time, control returns to step S2.

Figure 13:
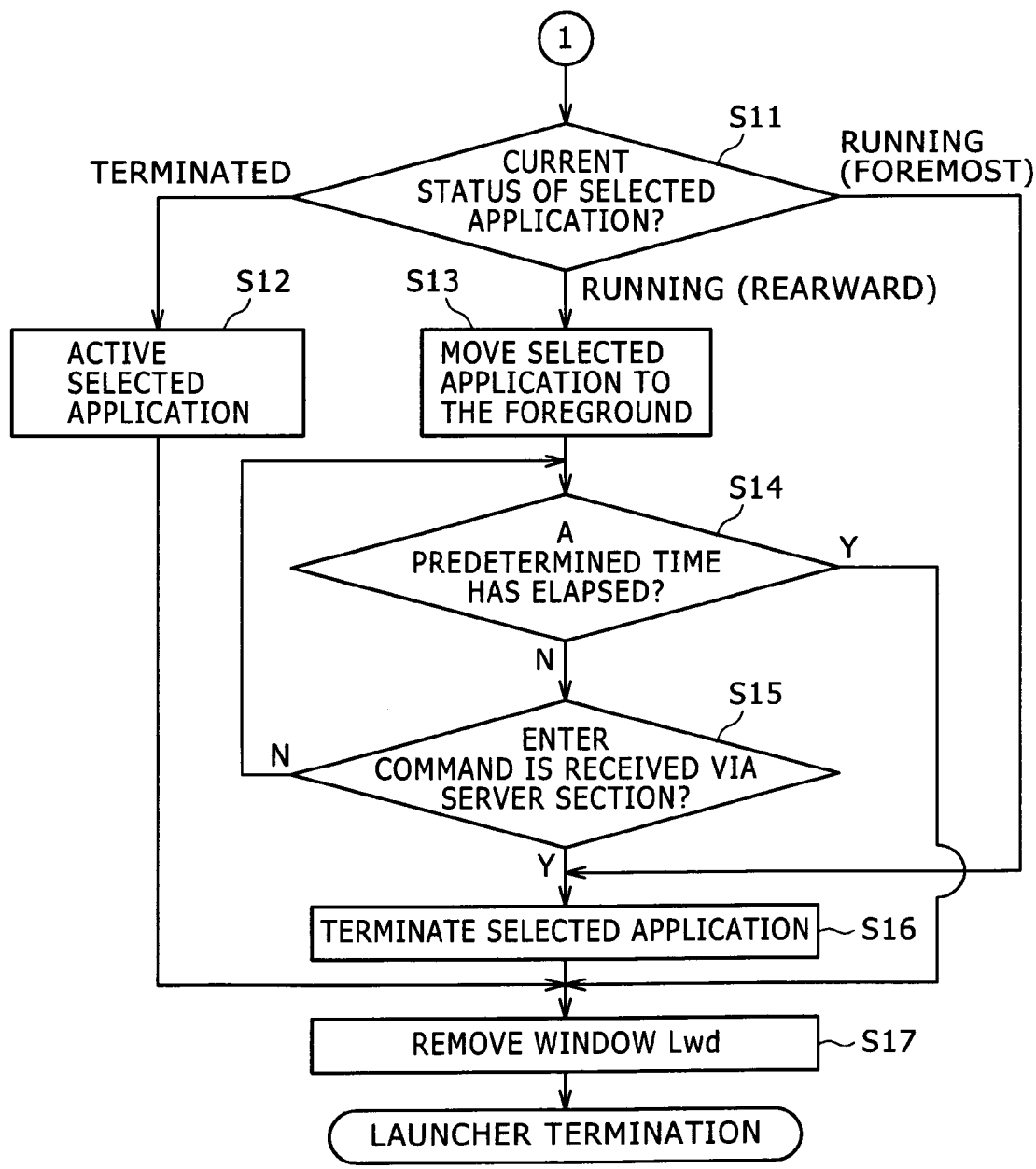
FIG. 13 is a flowchart illustrating a part of the operation procedure of the parts of the interface apparatus of FIG. 3.
Figure 14:
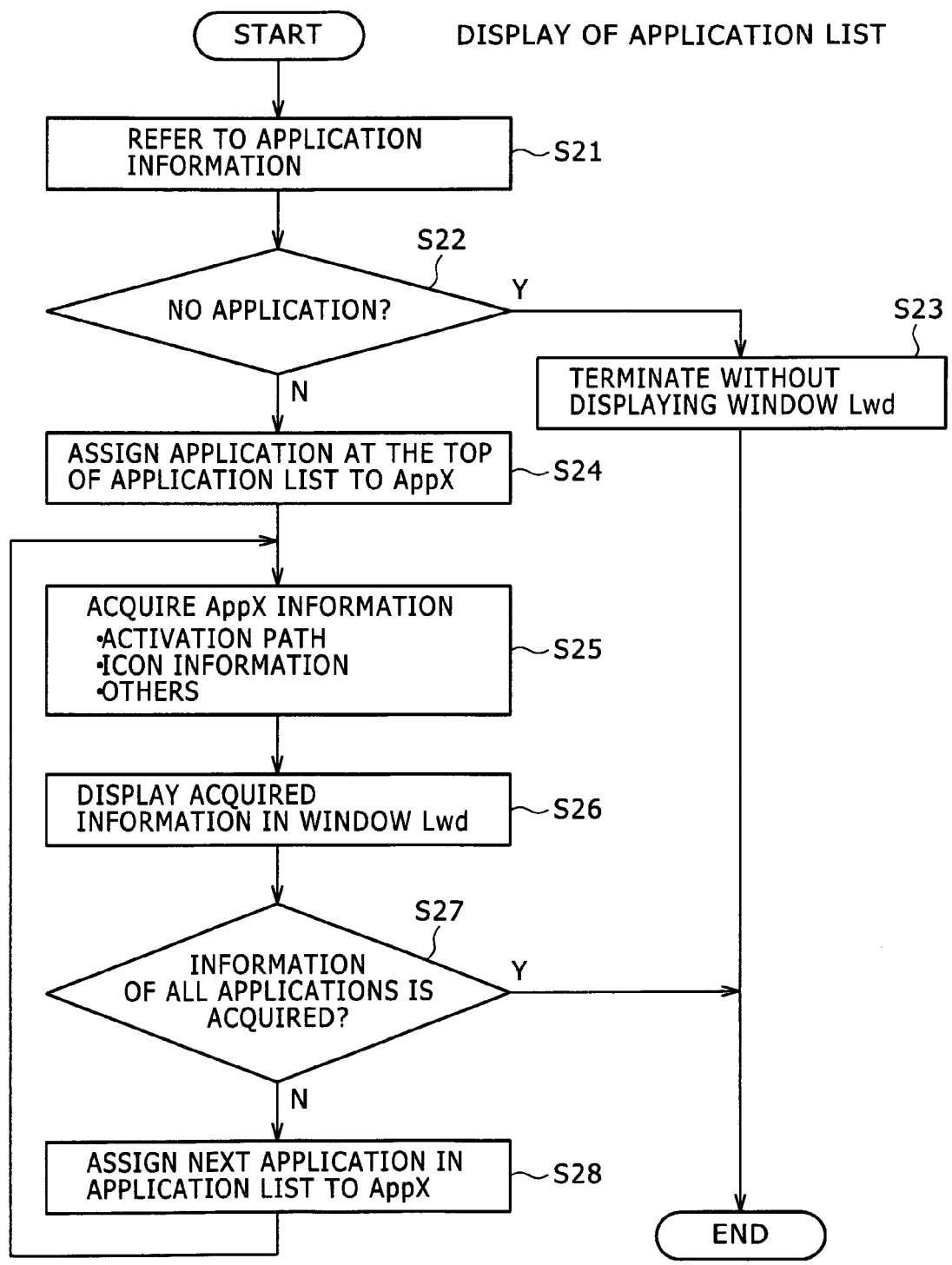
FIG. 14 is a flowchart illustrating an operation procedure of the parts of the interface apparatus of FIG. 3.

If it is determined at step S4 that the enter command has been received via the server section 200, the task-switching launcher 300 determines which status the current status of the selected application 400 is (step S11 of FIG. 13).

If it is determined at this step S11 that the current status of the selected application 400 is the "terminated" status, the task-switching launcher 300 sends the activation command to the selected application 400 to activate the selected application 400 (step S12). Then, the task-switching launcher 300 removes the window Lwd from the display screen 2D and is terminated (step S17).

Meanwhile, if it is determined at step S11 that the current status of the selected application 400 is the "running (foremost)" status, the task-switching launcher 300 sends the termination command to the selected application 400 to terminate the application 400 (step S16). Then, the task-switching launcher 300 removes the window Lwd from the display screen 2D and is terminated (step S17).

Meanwhile, if it is determined at step S11 that the current status of the selected application 400 is the "running (rearward)" status, the task-switching launcher 300 sends, to the selected application 400, the command to move to the foreground, thereby causing the operation window APwd of the application 400 to be moved to the foreground of the display screen 2D (step S13).

Then, the task-switching launcher 300 determines whether a predetermined time (e.g., three seconds) or longer has elapsed after the operation window APwd of the application 400 is moved to the foreground of the display screen 2D (step S14) and, if it is determined that the predetermined time or longer has not elapsed yet, determines whether the enter command has been received via the server section 200 (step S15).

If it is determined at step S15 that the enter command has not been received, control returns to step S14, whereas if it is determined that the enter command has been received, the task-switching launcher 300 sends the termination command to the selected application 400 to terminate the application 400 (step S16). Then, the task-switching launcher 300 removes the window Lwd from the display screen 2D and is terminated (step S17).

Meanwhile, if it is determined at step S14 that the predetermined time or longer has elapsed, the task-switching launcher 300 removes the window Lwd from the display screen 2D and is terminated (step S17).

Next, with reference to the flowchart of FIG. 14, a routine of referring to the application list when generating the window Lwd in step S1 of FIG. 12 will now be described below.

The task-switching launcher 300 refers to the information of registered applications 400, which may be stored in the application information storage means 311 (step S21). As a result of this reference, the task-switching launcher 300 determines whether there is no registered application 400 (step S22) and, if it is determined that there is no registered application 400, is terminated without displaying the task-switching launcher window Lwd (step S23). At this time, a message indicating that activation is impossible because there is no registered application may be displayed on the display screen 2D in order to attract the user's attention to the fact.

If it is determined at step S22 that there are one or more registered applications, the task-switching launcher 300 assigns the application at the top in the application list to a variable AppX indicating a target application (step S24) and acquires the information of this application AppX from the application information storage means 311 (step S25).

Then, using the icon information within the acquired information, this application is displayed in the window Lwd (step S26). Then, it is determined whether the information of all the registered applications has been acquired (step S27) and, if it is determined that the information of all the registered applications has not been acquired yet, the next application in the application list is assigned to the variable AppX indicating the target application (step S28). Thereafter, control returns to step S25, and the information of this application AppX is acquired from the application information storage means 311.

After this, the processes of step S25 to step S28 are repeated until the information of all the registered applications has been acquired, and when it is determined at step S27 that the information of all the registered applications has been acquired, this processing routine is finished.

[Processing Operation of the Server Section 200]

Figure 16:
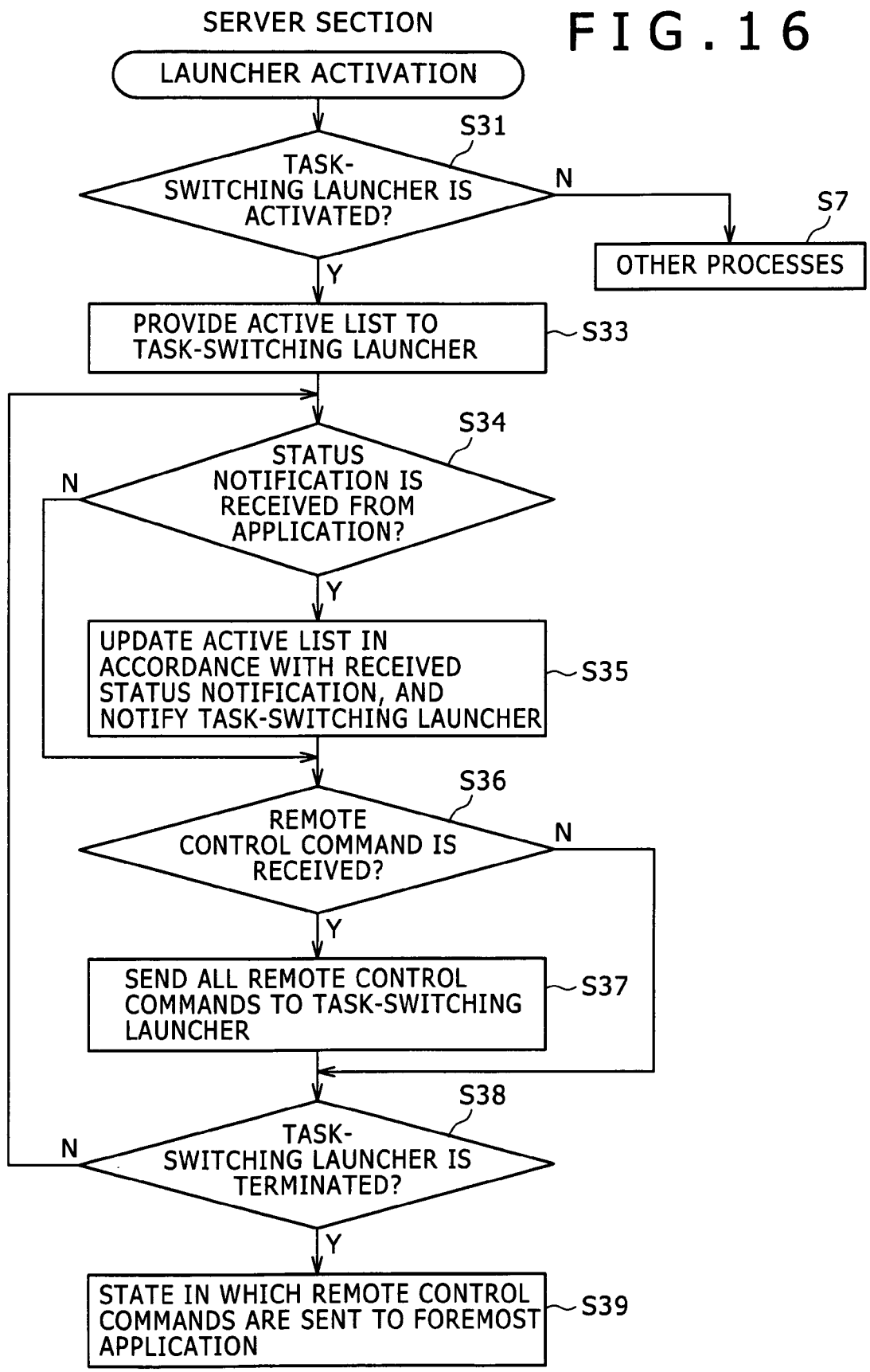
FIG. 16 is a flowchart illustrating an operation procedure of the parts of the interface apparatus of FIG. 3.

FIG. 16 is a flowchart for explaining a processing operation of the server section 200 when the task-switching launcher 300 is activated in response to the activation command coming through the server section 200.

The server section 200 determines whether the task-switching launcher 300 has been activated (step S31) and, if the task-switching launcher 300 has not been activated, performs other processes (step S32).

If it is determined at step S31 that the task-switching launcher 300 has been activated, the server section 200 provides, to the task-switching launcher 300, the active list which has been generated based on the status notification acquired from the applications 400 up to this moment (step S33).

Then, the server section 200 monitors whether the status notification has been received from any application 400 (step S34) and, if it is determined that the status notification has been received from an application 400, updates the active list in accordance with the received status notification and, if the task-switching launcher 300 is running, also forwards the received status notification to the task-switching launcher 300 (step S35).

After completion of this step S35, or if it is determined at step S34 that the status notification has not been received from any application 400, the server section 200 determines whether any remote control command has been received (step S36). If it is determined at this step S36 that one or more remote control commands have been received, all the received remote control commands are sent to the running task-switching launcher 300 (step S37).

Then, after completion of this step S37, or if it is determined at step S36 that no remote control command has been received, the server section 200 determines whether the task-switching launcher 300 has been terminated (step S38) and, if it is determined that the task-switching launcher 300 has not been terminated, control returns to step S34.

Meanwhile, if it is determined at step S38 that the task-switching launcher 300 has been terminated, the server section 200 comes into a state in which it will forward any remote control command to the application 400 whose operation window APwd is displayed on the foreground of the display screen 2D (step S39).

Note that the determination at step S38, i.e., of whether the task-switching launcher 300 has been terminated, may be made based on a status notification sent from the task-switching launcher 300 to the server section 200 or based on the enter command as a remote control command.

Next, with reference to the flowchart of FIG. 17, a process of generating the active list and a process of providing the status notification to the task-switching launcher 300, performed by the server section 200, will now be described below. A processing routine of FIG. 17 is started when the server section 200 has received the status notification from any application 400.

If the server section 200 receives the status notification from the application AppX, it analyzes the information of the received status notification (step S41). Then, as a result of this analysis, it is determined whether the received status notification is one that notifies that the application AppX has started running (step S42).

If it is determined at this step S42 that the received status notification is one that notifies that the application AppX has started running, the server section 200 adds the application AppX at the top in the active list and reduces the rank of an already-running application by one in the active list (step S43). Then, this processing routine is finished. As described previously, the order in which the applications are listed in the active list corresponds to the order in which the operation windows APwd thereof are arranged on the display screen 2D, with the operation window APwd of the application listed at the top in the active list arranged on the foreground of the display screen 2D (see FIG. 9).

If it is determined at step S42 that the received status notification is not one that notifies that the application AppX has started running, the server section 200 determines whether the received status notification is one that notifies that the application AppX has been terminated (step S44).

If it is determined at this step S44 that the received status notification is one that notifies that the application AppX has been terminated, the server section 200 removes the application AppX from the top of the active list, and increases the rank of the other running applications by one in the active list (step S45) Then, this processing routine is finished.

Meanwhile, if it is determined at step S44 that the received status notification is not one that notifies that the application AppX has been terminated, the server section 200 determines whether the received status notification is one that notifies that the application AppX has been moved to the foreground (step S46).

If it is determined at this step S46 that the received status notification is one that notifies that the application AppX has been moved to the foreground, the server section 200 moves the application AppX to the top in the active list while moving the other running applications rearward as appropriate, and forwards the status notification to the task-switching launcher 300 (step S47). Then, this processing routine is finished.

Meanwhile, if it is determined at step S46 that the received status notification is not one that notifies that the application AppX has been moved to the foreground, the server section 200 determines whether the received status notification is one that notifies that the application AppX has been moved rearward (step S48).

If it is determined at this step S48 that the received status notification is one that notifies that the application AppX has been moved rearward, the server section 200 lowers the rank of the application AppX rearward by one in the active list, and forwards the status notification to the task-switching launcher 300 (step S49). Then, this processing routine is finished.

Meanwhile, if it is determined at this step S48 that the received status notification is not one that notifies that the application AppX has been moved rearward, the server section 200 determines that the status notification is erroneous, and displays an error message, for example (step S50). Then, this processing routine is finished.

As described above, this embodiment realizes an information processing system utilizing a remote control, which accomplishes activation, termination, and the like of a plurality of applications with simple manipulations.

In the above-described embodiment, operation control can be achieved by four operation keys provided on the remote commander, i.e., the activation key 31 for the task-switching launcher, the left arrow key 32L, the right arrow key 32R, and the enter key 33. Therefore, this embodiment can be easily applied to a system involving constraints in a user operation input device.

For example, this embodiment can be effectively implemented in the case where operations have to be performed with a small number of keys because of constraints of space for operation keys, such as when a portable information processing terminal, such as a cellular phone terminal or a personal digital assistant (PDA), is employed.

[Variants]

It is to be appreciated that the way for indicating the application status in the task-switching launcher window is not limited to the use of color variations of the status indicator bars as described above. For example, instead of using the status indicator bars, character representations "Running on the Foreground", "Terminated", and "Running Rearward" may be provided, or each status may be indicated by using a different symbol mark.

Further, in the above-described embodiment, the interface apparatus is divided into the task-switching launcher and the server section. It is to be appreciated, however, that the functions of the server section may be incorporated into the task-switching launcher.

Still further, in the above-described embodiment, the task-switching launcher handles applications that are compatible with the remote control. It is to be appreciated, however, that the task-switching launcher may handle other types of applications.

Therefore, it is to be appreciated that the way of user operations is not limited to the use of the remote control.

Still further, in the above-described embodiment, registration and deletion of the applications into or out of the task-switching launcher are carried out at the time of installation or uninstallation thereof. However, the task-switching launcher may be provided with additional tasks of registration and deletion and these registration and deletion tasks may be executed, as necessary, to perform registration or deletion of an application already installed on the information processing apparatus 1.

Still further, this invention may be implemented as an interface apparatus in a main terminal device that performs centralized control on electronic devices connected to a network in a home network system composed of household electrical appliances.

It should be understood by those skilled in the art that various modifications, combinations, sub-combinations and alterations may occur depending on design requirements and other factors insofar as they are within the scope of the appended claims or the equivalents thereof.

The invention claimed is:

1. An interface apparatus stored in a computer storage medium that controls at least activation and termination of one or more registered application programs in accordance with user operations, the apparatus comprising:

first holding means configured to hold information of the one or more registered application programs;

user operation acceptance means configured to accept the user operations;

second holding means configured to receive and hold status information sent from each of the one or more application programs when that application program is activated or terminated;

list presentation means configured to present on a display screen an application program list window showing a list of the one or more application programs based on the information held in the first holding means when the user operation acceptance means has accepted a user operation directing that the interface apparatus be activated, and to indicate in the application program list window at least whether a status of each application program is a running status or a terminated status based on the status information held in the second holding means, the status of each application program being indicated by a color of a respective status indicator bar associated with that program, a first color indicating a terminated status and a second and a third color indicating a running status, the color of the respective status indicator bar changing when the status of the associated application program changes from the running status to the terminated status or from the terminated status to the running status;

selection means configured to select an application program to be controlled from among the one or more application programs shown in the application program list window in accordance with a predetermined first user operation accepted by the user operation acceptance means; and control means configured to control the status of the selected application program based on the status information held in the second holding means when the user operation acceptance means has accepted a predetermined second user operation, wherein a plurality of the one or more application programs are capable of being run concurrently, and of the plurality of running application programs, an application program whose operation window is arranged on a foreground of the display screen is capable of accepting the user operations via the user operation acceptance means, the running status of each application program includes a foremost status and a rearward status, the foremost status indicating that the operation window of the corresponding application program is arranged on the foreground of the display screen and the rearward status indicating that the operation window of the corresponding application program is arranged rearward on the display screen, the second holding means holds information indicating whether the status of each running application program is the foremost status or the rearward status, and the list presentation means indicates whether the status of each running application program is the foremost status or the rearward status, the foremost or rearward status of each application program being indicated by the color of its associated status indicator bar, the second color indicating one of the foremost or rearward status and the third color indicating another of the foremost or rearward status, the color of the respective status indicator bar changing when the status of the associated application program changes from the foremost status to the rearward status or from the rearward status to the foremost status.

2. The interface apparatus according to claim 1, wherein if the user operation acceptance means accepts the second user operation when a running application program whose status is the rearward status is selected by the selection means, the control means moves the operation window of the selected application program to the foreground of the display screen.

3. The interface apparatus according to claim 1, wherein the user operation acceptance means includes a remote commander and reception means configured to receive a remote control signal transmitted from the remote commander.

4. The interface apparatus according to claim 3, wherein the second user operation is an operation of an enter key.

5. The interface apparatus according to claim 3, wherein the first user operation is an operation of one of left/right arrow keys or up/down arrow keys provided on the remote commander, and the second user operation is an operation of an enter key provided on the remote commander.

6. The interface apparatus according to claim 2, wherein
if the status of the selected application program is the foremost status when the user operation acceptance means has accepted the second user operation, the control means terminates the selected application program and then removes the application program list window immediately from the display screen, if the status of the selected application program is the terminated status when the user operation acceptance means has accepted the second user operation, the control means activates the selected application program and then removes the application program list window immediately from the display screen, and if the status of the selected application program is the rearward status when the user operation acceptance means has accepted the second user operation, the control means moves the operation window of the selected application program to the foreground of the display screen, then waits for a predetermined time, and, if no user operation is accepted by the user operation acceptance means during the predetermined time, the control means removes the application program list window immediately from the display screen.

7. An interface method employed in an information processing apparatus for controlling at least activation and termination of one or more registered application programs in accordance with user operations, the method comprising:

receiving and holding information of the one or more registered application programs;

receiving and holding status information sent from each of the one or more application programs when that application program is activated or terminated;

presenting on a display screen an application program list window showing a list of the one or more application programs based on the held information of the one or more application programs, and indicating in the application program list window at least whether a status of each application program is a running status or a terminated status based on the held status information, the status of each application program being indicated by a color of a respective status indicator bar associated with that program, a first color indicating a terminated status and a second and a third color indicating a running status, the color of the respective status indicator bar changing when the status of the associated application program changes from the running status to the terminated status or from the terminated status to the running status;

selecting an application program to be controlled from among the one or more application programs shown in the application program list window in accordance with a predetermined first user operation; and controlling the status of the selected application program based on the held status information in accordance with a predetermined second user operation, wherein a plurality of the one or more application programs are capable of being run concurrently, and of the plurality of running application programs, an application program whose operation window is arranged on a foreground of the display screen is capable of accepting the user operations, the running status of each application program includes a foremost status and a rearward status, the foremost status indicating that the operation window of the corresponding application program is arranged on the foreground of the display screen and the rearward status indicating that the operation window of the corresponding application program is arranged rearward on the display screen, and the presenting step includes indicating whether the status of each running application program is the foremost status or the rearward status, the foremost or rearward status of each application program being indicated by the color of its associated status indicator bar, the second color indicating one of the foremost or rearward status and the third color indicating another of the foremost or rearward status, the color of the respective status indicator bar changing when the status of the associated application program changes from the foremost status to the rearward status or from the rearward status to the foremost status.

8. A processor encoded with a computer program for carrying out a process for controlling at least activation and termination of one or more registered application programs in accordance with user operations, the process comprising:

holding information of the one or more registered application programs;

receiving and holding status information sent from each of the one or more application programs when that application program is activated or terminated;

presenting on a display screen an application program list window showing a list of the one or more application programs based on the held information of the one or more application programs, and indicating in the application program list window at least whether a status of each application program is a running status or a terminated status based on the held status information, the status of each application program being indicated by a color of a respective status indicator bar associated with that program, a first color indicating a terminated status and a second and a third color indicating a running status, the color of the respective status indicator bar changing when the status of the associated application program changes from the running status to the terminated status or from the terminated status to the running status;

selecting an application program to be controlled from among the one or more application programs shown in the application program list window in accordance with a predetermined first user operation; and controlling the status of the selected application program based on the held status information in accordance with a predetermined second user operation, wherein a plurality of the one or more application programs are capable of being run concurrently, and of the plurality of running application programs, an application program whose operation window is arranged on a foreground of the display screen is capable of accepting the user operations, the running status of each application program includes a foremost status and a rearward status, the foremost status indicating that the operation window of the corresponding application program is arranged on the foreground of the display screen and the rearward status indicating that the operation window of the corresponding application program is arranged rearward on the display screen, and the presenting step includes indicating whether the status of each running application program is the foremost status or the rearward status, the foremost or rearward status of each application program being indicated by the color of its associated status indicator bar, the second color indicating one of the foremost or rearward status and the third color indicating another of the foremost or rearward status, the color of the respective status indicator bar changing when the status of the associated application program changes from the foremost status to the rearward status or from the rearward status to the foremost status.

9. An interface apparatus stored in a computer storage medium that controls at least activation and termination of one or more registered application programs in accordance with user operations, the apparatus comprising:

a first holding section that holds information of the one or more registered application programs;

a user operation acceptance section that accepts the user operations;

a second holding section that receives and hold status information sent from each of the one or more application programs when that application program is activated or terminated;

a list presentation section that presents on a display screen an application program list window showing a list of the one or more application programs based on the information held in the first holding section when the user operation acceptance section has accepted a user operation directing that the interface apparatus be activated, and to indicate in the application program list window at least whether a status of each application program is a running status or a terminated status based on the status information held in the second holding section, the status of each application program being indicated by a color of a respective status indicator bar associated with that program, a first color indicating a terminated status and a second and a third color indicating a a running status, the color of the respective status indicator bar changing when the status of the associated application program changes from the running status to the terminated status or from the terminated status to the running status;

a selection section that selects an application program to be controlled from among the one or more application programs shown in the application program list window in accordance with a predetermined first user operation accepted by the user operation acceptance section; and a control section that controls the status of the selected application program based on the status information held in the second holding section when the user operation acceptance section has accepted a predetermined second user operation, wherein a plurality of the one or more application programs are capable of being run concurrently, and of the plurality of running application programs, an application program whose operation window is arranged on a foreground of the display screen is capable of accepting the user operations via the user operation acceptance section, the running status of each application program includes a foremost status and a rearward status, the foremost status indicating that the operation window of the corresponding application program is arranged on the foreground of the display screen and the rearward status indicating that the operation window of the corresponding application program is arranged rearward on the display screen, the second holding section holds information indicating whether the status of each running application program is the foremost status or the rearward status, and the list presentation section indicates whether the status of each running application program is the foremost status or the rearward status, the foremost or rearward status of each application program being indicated by the color of its associated status indicator bar, the second color indicating one of the foremost or rearward status and the third color indicating another of the foremost or rearward status, the color of the respective status indicator bar changing when the status of the associated application program changes from the foremost status to the rearward status or from the rearward status to the foremost status.

\* \* \* \* \*